US012046767B2

United States Patent
Foran et al.

(10) Patent No.: US 12,046,767 B2
(45) Date of Patent: Jul. 23, 2024

(54) BATTERY CONTAINMENT SYSTEM

(71) Applicant: Continental Structure Plastics, Inc., Auburn Hills, MI (US)

(72) Inventors: Hugh Foran, Auburn Hills, MI (US); Patrick Durham, Auburn Hills, MI (US); Masatomo Teshima, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 134 days.

(21) Appl. No.: 17/463,840

(22) Filed: Sep. 1, 2021

(65) Prior Publication Data

US 2022/0006150 A1 Jan. 6, 2022

Related U.S. Application Data

(60) Provisional application No. 63/047,951, filed on Jul. 3, 2020.

(51) Int. Cl.
| | |
|---|---|
| *H01M 50/242* | (2021.01) |
| *H01M 10/63* | (2014.01) |
| *H01M 50/209* | (2021.01) |
| *H01M 50/227* | (2021.01) |
| *H01M 50/231* | (2021.01) |

(Continued)

(52) U.S. Cl.
CPC ......... *H01M 50/242* (2021.01); *H01M 10/63* (2015.04); *H01M 50/209* (2021.01); *H01M 50/227* (2021.01); *H01M 50/231* (2021.01); *H01M 50/24* (2021.01); *H01M 50/249* (2021.01); *H01M 50/262* (2021.01); *H01M 50/278* (2021.01); *H01M 50/282* (2021.01);

(Continued)

(58) Field of Classification Search
CPC .. H01M 50/242; H01M 10/63; H01M 50/249; H01M 50/24; H01M 50/231; H01M 50/278; H01M 50/227; H01M 50/262; H01M 50/289; H01M 50/209; H01M 50/282; H01M 2220/20
See application file for complete search history.

(56) References Cited

U.S. PATENT DOCUMENTS

| | | | |
|---|---|---|---|
| 10,371,181 B1* | 8/2019 | Reibling | F16B 2/02 |
| 2009/0111015 A1* | 4/2009 | Wood | H01M 10/12 |
| | | | 429/164 |

(Continued)

FOREIGN PATENT DOCUMENTS

| | | | |
|---|---|---|---|
| CN | 106003850 | * 10/2016 | B32B 3/12 |

*Primary Examiner* — Matthew T Martin
*Assistant Examiner* — Taylor Harrison Krone
(74) *Attorney, Agent, or Firm* — MaxGoLaw PLLC

(57) ABSTRACT

A battery containment system is provided that includes a unitary battery tray having a bottom and walls that from the bottom of said tray and defining a cavity within the tray. A cover is includes having a cover body portion and a first flange extending from the cover body portion, the cover body portion configured to overlie the cavity within the tray and the walls of the tray, the first flange of said cover configured to extend beyond the walls of the tray. A shield having a shield body portion and a second flange extending from the shield body portion, the shield body portion is configured to underlie the bottom of the tray, the second flange of the shield is configured to extend beyond the bottom of the tray and configured to engage the first flange of the cover.

19 Claims, 31 Drawing Sheets

(51) Int. Cl.
  *H01M 50/24*    (2021.01)
  *H01M 50/249*   (2021.01)
  *H01M 50/262*   (2021.01)
  *H01M 50/278*   (2021.01)
  *H01M 50/282*   (2021.01)
  *H01M 50/289*   (2021.01)

(52) U.S. Cl.
  CPC ...... *H01M 50/289* (2021.01); *H01M 2220/20* (2013.01)

(56) References Cited

U.S. PATENT DOCUMENTS

| | | | |
|---|---|---|---|
| 2012/0321927 A1* | 12/2012 | Loo | H01M 50/224 |
| | | | 429/100 |
| 2018/0272853 A1* | 9/2018 | Wang | H01M 50/204 |
| 2018/0337377 A1* | 11/2018 | Stephens | B60K 1/04 |
| 2020/0156486 A1* | 5/2020 | Howard | B60L 50/64 |
| 2021/0151818 A1* | 5/2021 | Becker | B60L 50/64 |
| 2021/0210808 A1* | 7/2021 | Schmitz | H01M 10/613 |
| 2021/0245596 A1* | 8/2021 | Arana | H01M 50/242 |
| 2023/0041000 A1* | 2/2023 | Tandon | B62D 25/08 |

* cited by examiner

FIG. 4K    FIG. 5K
FIG. 4L 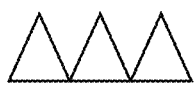   FIG. 5L
FIG. 4M    FIG. 5M
FIG. 4N 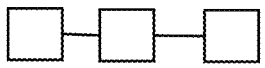   FIG. 5N
FIG. 4O    FIG. 5O
FIG. 4P 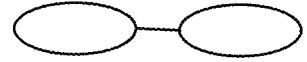   FIG. 5P
FIG. 4Q 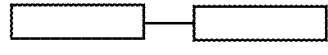   FIG. 5Q
FIG. 4R 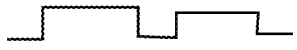   FIG. 5R

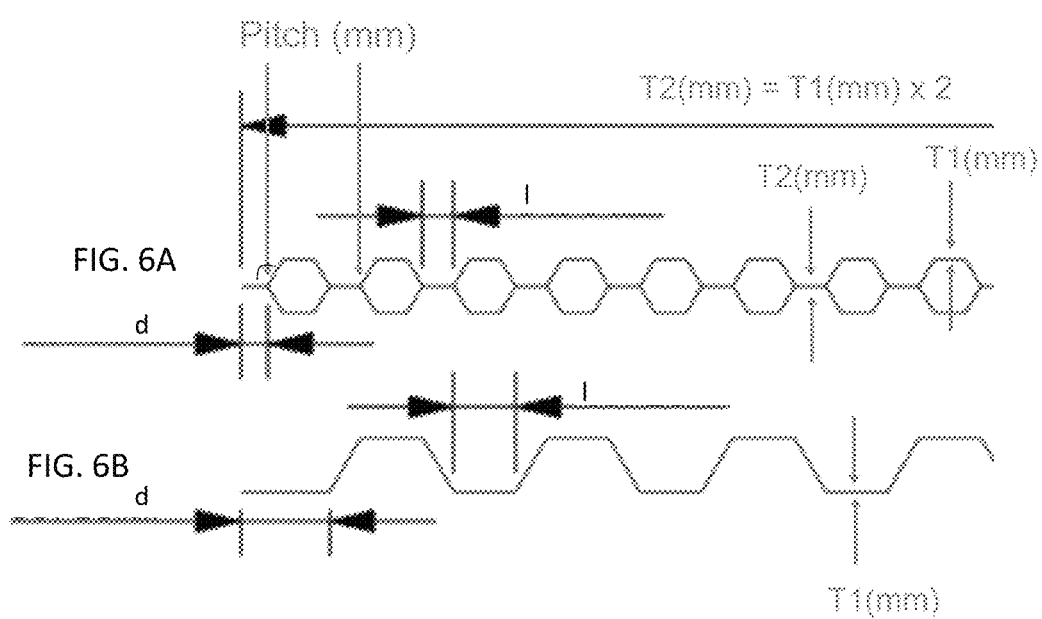

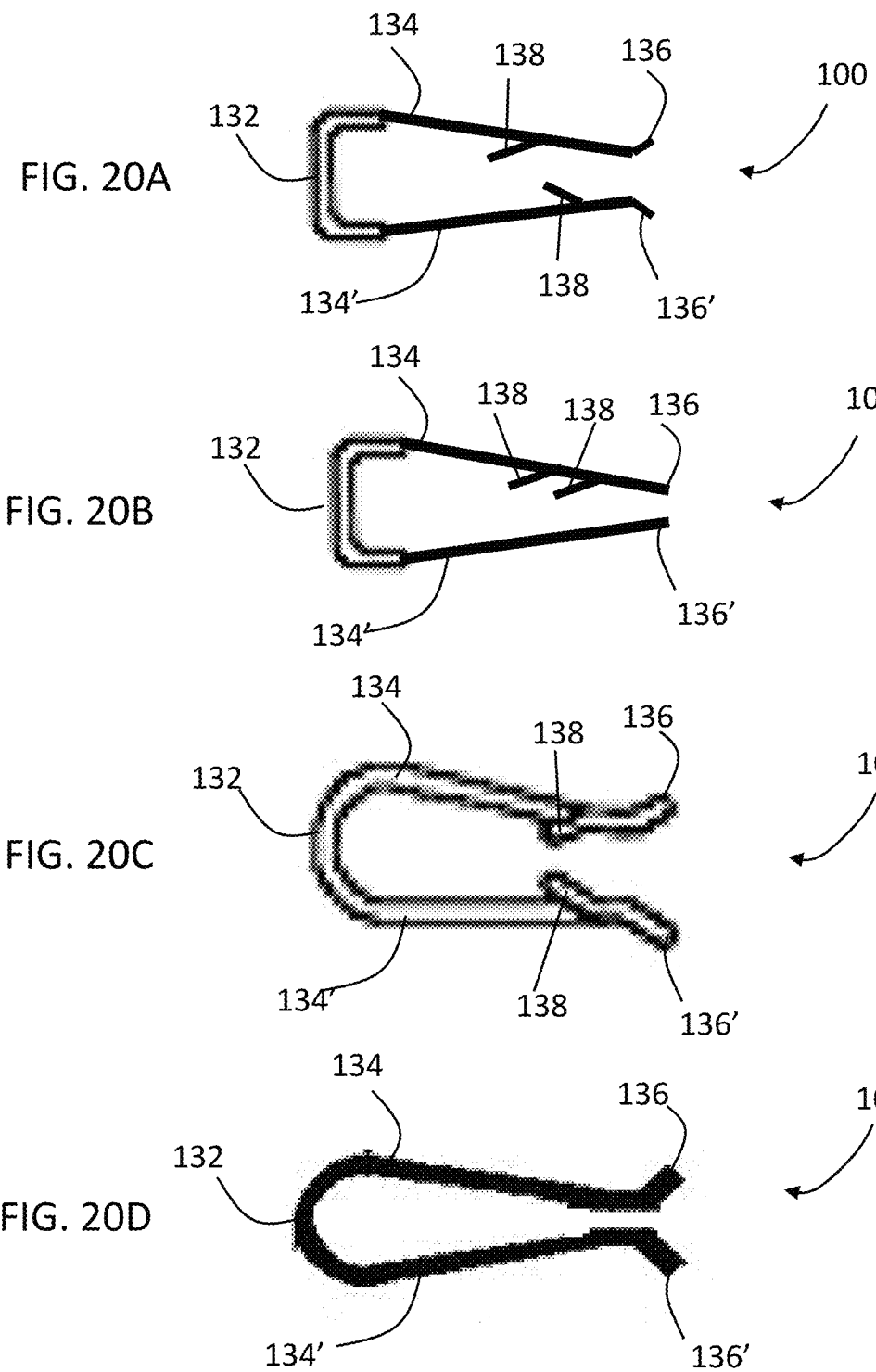

BATTERY CONTAINMENT SYSTEM

RELATED APPLICATIONS

This application claims priority benefit of U.S. Provisional Application Ser. No. 63/047,951 filed Jul. 3, 2020; the contents of which are hereby incorporated by reference.

FIELD OF THE INVENTION

The present invention in general relates to a high strength, light weight containment system and in particular to a high strength, light weight containment system for containing for example, a fuel cell or battery, to provide impalement resistance, impact resistance, fire resistance, and fluid penetration prevention.

BACKGROUND OF THE INVENTION

Weight savings in the automotive, transportation, aerospace, and logistics-based industries has been a major focus in order to make more fuel-efficient vehicles both for ground and air transport. In order to achieve these weight savings, light weight composite materials have been introduced to take the place of metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for reasons that include materials which are stronger, lighter, or less expensive when compared to traditional materials of steel or aluminum. Still another advantage over metals is reduced corrosion, leading to longer operational life and reduced maintenance costs.

Composites typically have two constituent materials: matrix and reinforcement. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination.

The use of fiber inclusions to strengthen a matrix is well known to the art. Well established mechanisms for the strengthening of a matrix include slowing and elongating the path of crack propagation through the matrix, as well as energy distribution associated with pulling a fiber free from the surrounding matrix material. In the context of sheet molding composition (SMC) formulations, bulk molding composition (BMC) formulations, and resin transfer molding (RTM) fiber strengthening has traditionally involved usage of chopped glass fibers, while carbon fibers are known to be high strength and low weight reinforcements.

Weight savings are particularly important for electric and hybrid vehicles powered with energy cells employing battery technologies in order to achieve greater vehicle driving range per charge. However, unique problems associated with some components of electric and hybrid vehicles have hindered the ability to use composite materials for some applications on hybrid or electric vehicles. For example, batteries of electric and hybrid vehicles present unique safety considerations owing to the high voltages of the batteries, chemicals employed in the battery technologies, combustion and fire risks associated with the batteries, and potential fume encounters if the batteries are broken or damaged. Therefore, batteries of electric and hybrid vehicles generally require protective containers designed to shield batteries from forces they may otherwise experience during an impact or crash event.

Generally, such protective containers are high strength boxes formed of welded metals, which are heavy, prone to corrosion, and have been found to be water penetrable at at least the welds. Attempts have been made to form protective battery containers from composite materials to reduce the weight of such containers. However, such containers are usually joined with metal bolts, which require additional machining of through holes in the composite material of the container, which is difficult because of the high strength of the material through which the holes must be drilled, placement of the bolts in the through holes, and securing of the bolts with nuts, leading to complex manufacturing techniques, slow manufacturing throughputs, and high manufacturing costs. Additionally, typical battery containment boxes formed of composite material are prone to degraded seals and failure given that the metal bolts and nuts used to join portions of the boxes together rub against and wear down the composite material near the bolt holes. Another drawback of typical battery composite material containment boxes is that the boxes do not always provide sufficient protection of the batteries contained therein. That is, the batteries in such boxes are at risk of damage and fire in the event of an impact or impalement.

Thus, there exists a need for a battery containment system design that utilizes composite materials to lower the weight of the components thereof, while improving the safety performance compared to conventional vehicle components, increasing manufacturing throughput and, improving the seal and performance of the battery containment system and providing greater impact and impalement protection as compared to conventional vehicle components.

SUMMARY OF THE INVENTION

A battery containment system is provided that includes a unitary battery tray having a bottom and walls that include a first side wall, a second side wall, a first end wall, and a second end wall, the walls extending from the bottom of said tray and defining a cavity within the tray. A cover is includes having a cover body portion and a first flange extending from the cover body portion, the cover body portion configured to overlie the cavity within the tray and the walls of the tray, the first flange of said cover configured to extend beyond the walls of the tray. A shield having a shield body portion and a second flange extending from the shield body portion, the shield body portion is configured to underlie the bottom of the tray, the second flange of the shield is configured to extend beyond the bottom of the tray and configured to engage the first flange of the cover.

BRIEF DESCRIPTION OF THE DRAWINGS

The present invention is further detailed with respect to the following drawings that are intended to show certain aspects of the present invention but should not be construed as a limit on the practice of the present invention.

FIGS. 6A and 6B show a side view of energy absorption components of FIGS. 4A and 4B, respectively, with dimension indicators;

FIGS. 14A-14D are a front perspective view, a perspective view, a front view, and a top view, respectively of a portion of an energy absorption component according to embodiments of the present invention;

FIGS. 20A-20D are side views of joiner clips according to embodiments of the present invention;

DESCRIPTION OF THE INVENTION

Figure 1:
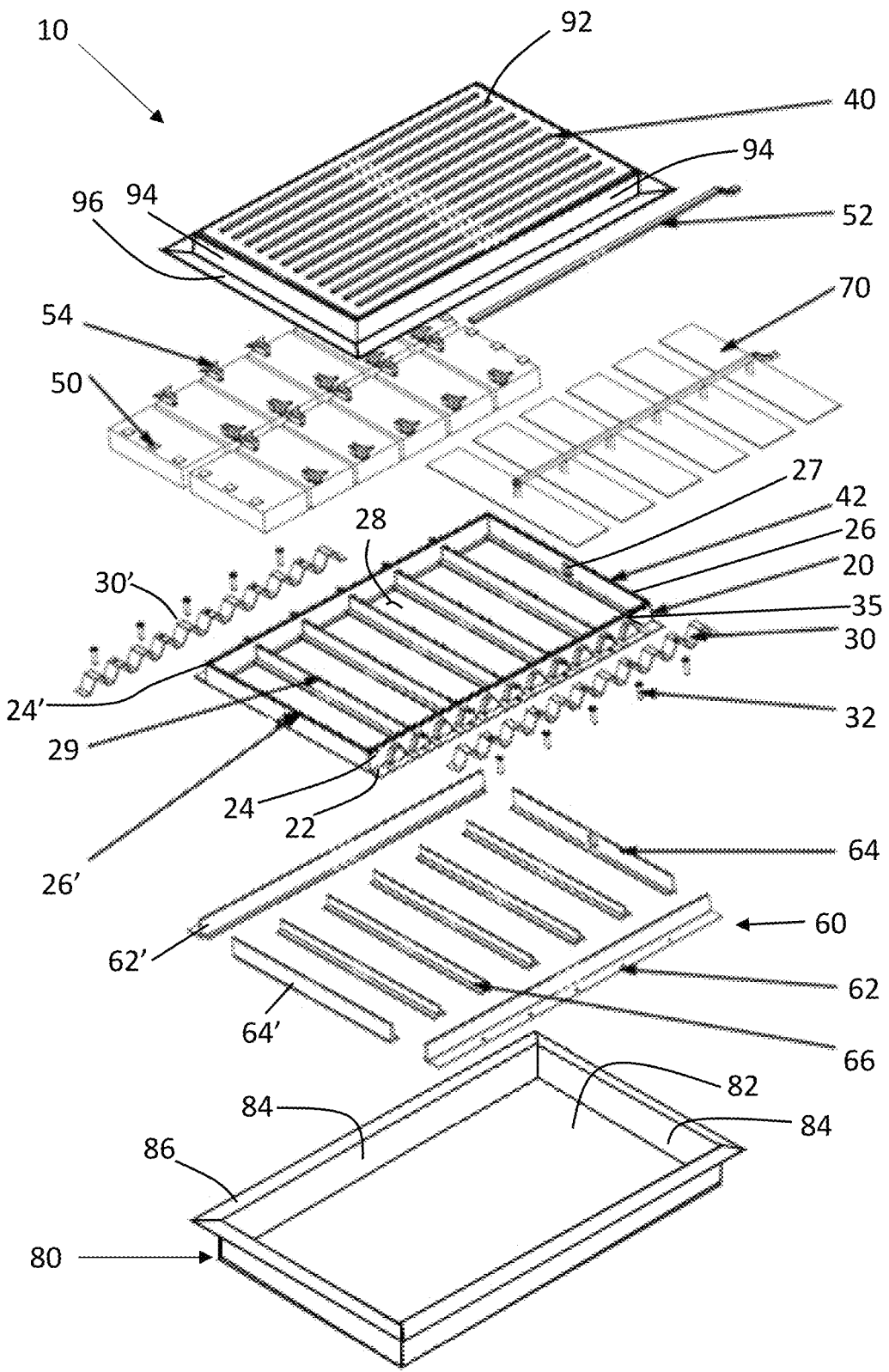
FIG. 1 is an exploded perspective view of a battery containment system according to embodiments of the present invention.

The present invention has utility as a high strength, light weight, sealable containment system for containing and protecting energy cells or batteries that provides impalement resistance, impact resistance, fire resistance, and fluid penetration prevention. Battery cases are getting bigger year by year due to the increase in amount of batteries installed. For example, the length of the battery case in the vehicle width direction is often 70% or more with respect to the vehicle width, and sometimes 80% or more. For this reason, when a large battery case is mounted in the lower part of the vehicle, a larger load is input to the battery case at the time of a collision rather than previous battery cases. Therefore, embodiments of the present invention include a shock structure/energy absorber to protect the battery from forces during potential impacts with other vehicles or objects. Additionally, because of the position and size of a battery case on vehicles, the batteries are susceptible to impalement from road or collision debris. Therefore, according to embodiments, the inventive battery containment system includes a shield that is designed to resist such impalements in order to protect the batteries. Furthermore, because vehicle batteries are prone to extreme fire in the event of an impact or impalement, embodiments of the present inventive containment system provide a sealed battery environment to keep fluid and moisture out during normal operation and to limit oxygen in the event of a battery fire.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below. As used in the description of the invention and the appended claims, the singular forms "a," "an" and "the" are intended to include the plural forms as well, unless the context clearly indicates otherwise. Also as used herein, "and/or" refers to and encompasses any and all possible combinations of one or more of the associated listed items, as well as the lack of combinations when interpreted in the alternative ("or").

As used herein "fluid penetration" refers to a single piece or joined piece that prevents unintended transit of gaseous or liquid coolants through a containment system in general.

Referring now to the figures, a battery containment system 10 according to embodiments of the present invention includes a tray 20, a cover 40, a shield 80, and a joiner clip 100. In some inventive embodiments, as shown in the figures, a pair of energy absorption components 30, 30' are provided to impart impact resistance to the system 10. It is appreciated that the relative placement of an inventive system 10 on a vehicle largely dictates the need for additional impact resistance. By way of example, a system 10 surrounded by a vehicle chassis has reduced or no need for energy absorption components, while in contrast, placement under a vehicle side door has a considerable need to inhibit impact induced intrusion into the contained volume of a system 10.

The tray 20, the pair of energy absorption components 30, 30', if present, the cover 40, and the shield 80 are configured to be assembled in such a way as to form a high strength, light weight containment system 10 that provides impalement resistance, impact resistance, fire resistance, and fluid penetration prevention to contents contained within the system 10, which according to embodiments is a plurality of batteries 50. The containment system 10 is particularly suitable for containing batteries of a hybrid or electric vehicle. The battery containment system 10 seals the batteries off from the external environment, protects the batteries from impalement from objects such as crash and road debris, and absorbs and dissipates kinetic energy experienced during a crash or impact event. In particular, the battery containment system 10 according to embodiments of the present invention exhibits minimal (less than 40%) intrusion into the enclosure and high resistance (at least 80 kN) to the impact when subjected to a quasi-static load by a 10 inch (25 cm) diameter rigid column located at the center of the battery and traveling perpendicular into a predominate longitudinal or lateral edge of the battery containment system 10. Additionally, during such crash event or impacts, the content of the system 10, such as batteries contained experience limited deformation of the cell perimeter and the high voltage wiring connecting the batteries to other systems of the electric or hybrid vehicle experiences little to no loading.

Figure 28:
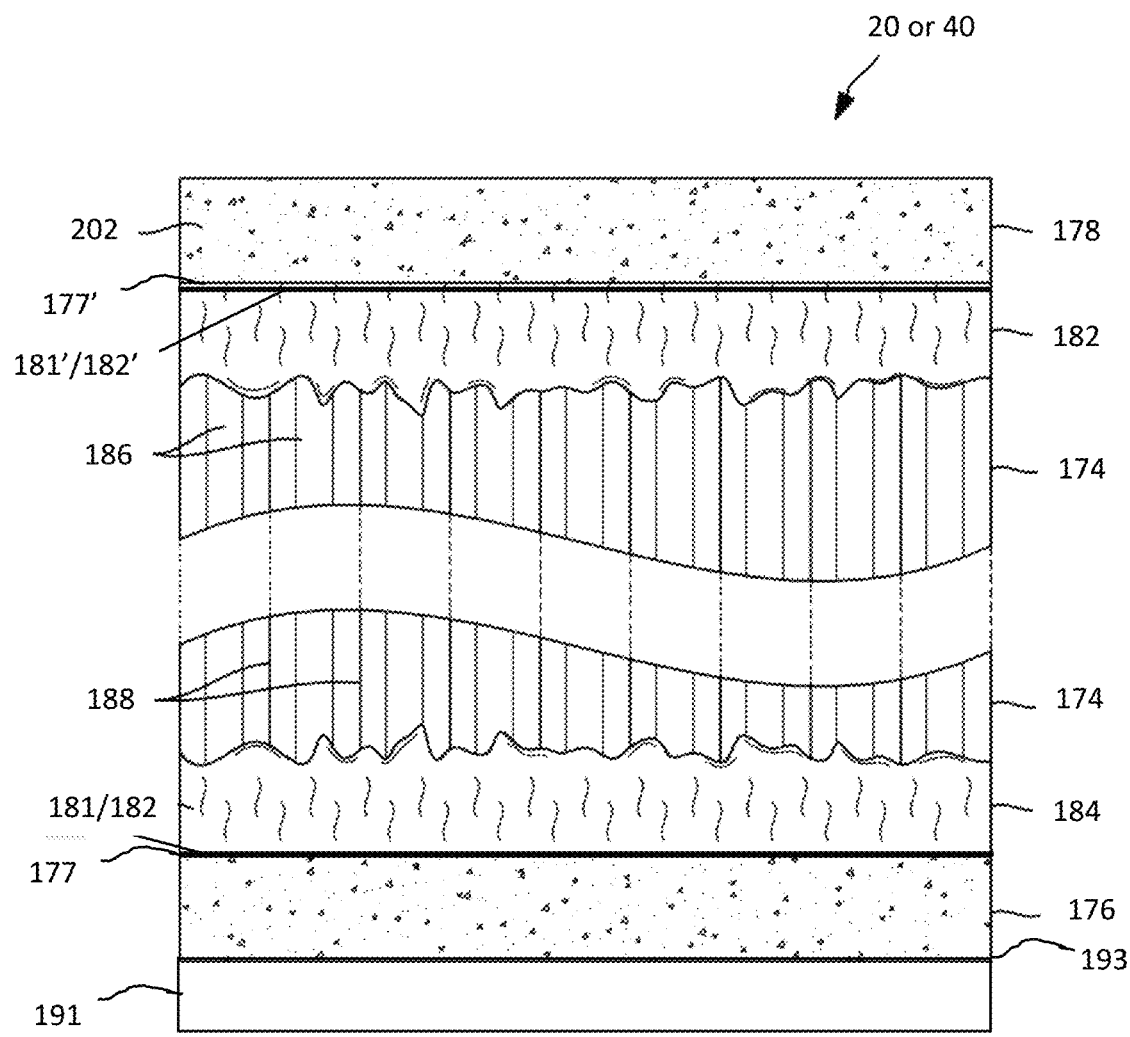
FIG. 28 is an enlarged partial cutaway, side view of a composite sandwich assembly of an open cell construct for a tray or cover according to the present invention.
Figure 29A:
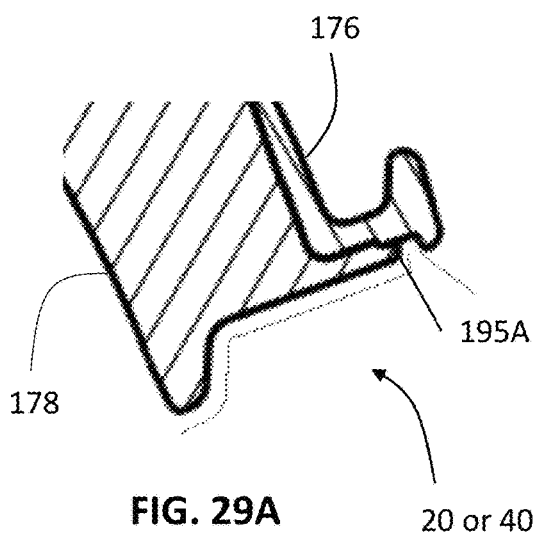
FIGS. 29A-29D are cross-sectional views of edges according to the present invention.
Figure 29B:
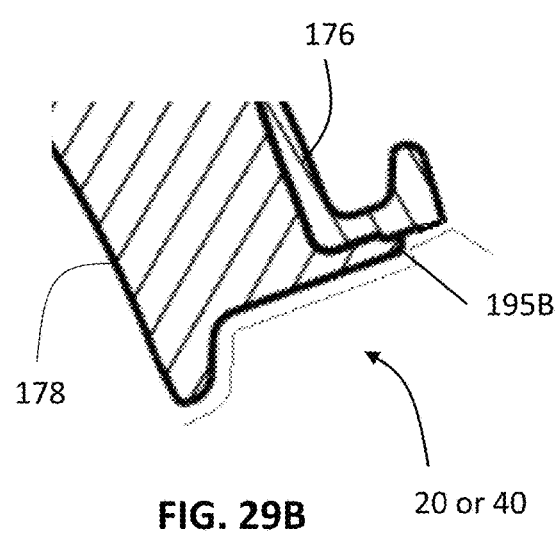
Figure 29C:
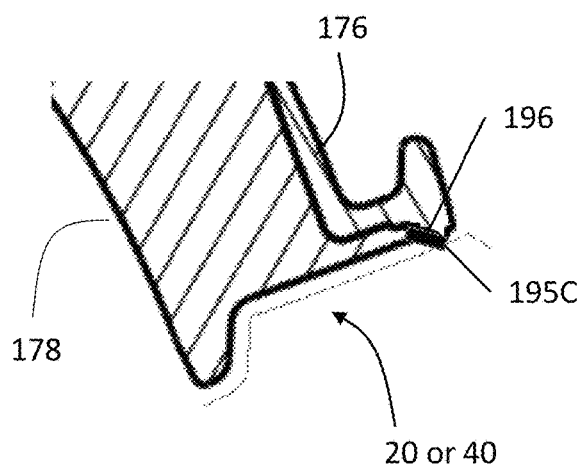
Figure 29D:
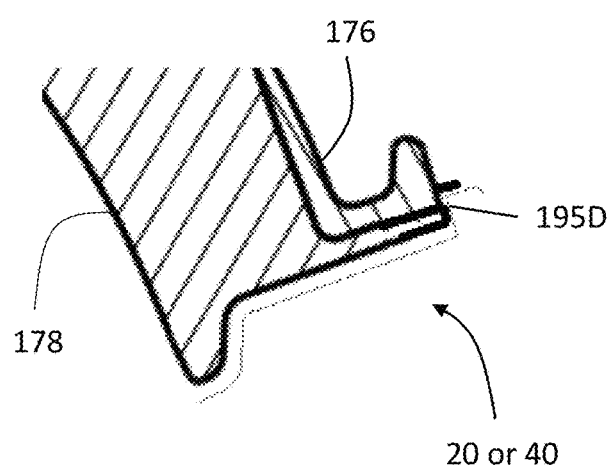

As shown in FIG. 28, the tray 20 or cover 40 has an open area core 174 with walls 188 defining an ordered array of pores 186 terminating in faces 177 and 177'. The open area core 174 is positioned between a first sheet 176 on one side and second sheet 178 on an opposite side therefrom. A first sheet 176 is cutaway to reveal the adhesive 182, a cloth 181, if present; and the open area core 174. The second surface sheet 178 is adhered to a first side of the open area core 174 by a first adhesive layer 182' that also may be reinforced with a cloth 181'. The structural skin 178 is adhered to an opposing second side of the open area core 174 by a second adhesive layer 184. In some inventive embodiments, a cloth 181' is present intermediate between the face 177' of open area core 174 and the structural skin 176, the cloth 181' embedded within the adhesive 184. In some inventive embodiments, the first sheet 174 is faced with material to impart impact resistance such as ABS, PVC, or polycarbonate polymers to form a high impact resistant surface 179. A first or second surface sheet according to the present invention and as shown for example with respect to reference numeral 176 or 178 is formed from sheet molding compound (SMC), thermoplastic, dicyclopentadiene (DCPD), overmolded polyurethane (PU), or a combination thereof. According to embodiments, the surface sheet 176 or 178 includes a filler material 202 to reinforce and/or serve to decrease the weight of the surface sheet 176 or 178. The filler material 202 is any of glass fibers, carbon fibers, natural fibers, hollow or solid glass microspheres, or a combination thereof. The fibers may be oriented or non-oriented. In some inventive embodiments in which SMC forms the high gloss surface, a resin package sold by Continental Structural Plastics, Inc. under the tradenames TCA®. Exemplary formulations of which are detailed in U.S. Pat. No. 7,700,670; WO2017/184761; and U.S. Pat. No. 7,524,547B2. It is appreciated that the surface sheets 176 or 178 routinely includes additives to retain dimensionality. Such additives routinely including glass fiber; carbon fiber; inorganic particulate fillers such as calcium carbonate, talc, and carbon black; glass microspheres; carbon nanotubes; graphene; low profile additives; moisture scavengers; and combinations thereof. Typical thicknesses of the high gloss surface sheet in the present invention range from 0.5 to 5 millimeters (mm) without regard to edges.

The tray 20 or cover 40 of an inventive battery containment system 10 includes a bottom 22 and walls including a first and second side wall 24, 24' and a first and second end wall 26, 26'. The walls extend from one side of the bottom 22 of the tray 20. The walls and the bottom 22 define a cavity 28 within the tray 10. The first and second energy absorption components 30, 30' are attached to the bottom 22 of the tray 20 external to the cavity 28. That is, a first of the energy absorption components 30 is attached to the bottom 22 of the tray 20 external to the first side wall 24 while the second energy absorption component 30' is attached to the bottom 22 of the tray 20 external to the second side wall 24'. It is appreciated that the tray 20 is readily formed of traditional SMC or an open areas core sandwich structure as detailed in co-owned application publication WO2020/117717A1. It is further appreciated that in the formation of a tray 20 or cover 40 in some inventive embodiments that there is no need for a high gloss surface and instead is provided with a skin to enhance a property such as impact resistance, or fire retardency.

According to embodiments, at least some pores 186 of the open area core 174 are in fluid communication with at least one other pore 186. According to embodiments, the fluid communication is established by forming a transverse hole through a side wall 188 of at least some of the pores 186. Such holes can be formed in the material of the open area core 174 before the material is formed into the pores of the open are core. Alternatively, the holes allowing for fluid communication between the pores can be formed in the walls 188 of the core 174 after the pores 186 are formed. Fluid communication between at least some of the pores 186 ensures that air that is caught within a pore is able to move to another pore in the event that a given pore is crushed or otherwise deformed. As will be described in greater detail below with respect to FIGS. 29A-29D, in some embodiments the edge region of the core material is crushed to form a sealed edge. In such situations, it is beneficial to provide transverse holes in the walls 188 of at least some of the pores 186, for example those near the edge to be sealed, such that when the seal is formed and the pores 186 near the edge are crushed, the air of those crushed pores is able to move into adjacent pores via the transverse holes.

An open area core, such as that depicted at 174 is formed of a lightweight material that defines a plurality of pores 186 so as to reduce the overall density of the open area core 174. An open area core according to the present invention is formed from a variety of materials that include cellulosics such as corrugated fiberboard, paper board, paper stock; thermoplastics such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer; thermosets such as polyesters, polyureas, polyurethanes, polyurea/polyurethanes, epoxies, vinyl esters; metal such as aluminum, magnesium, and alloys of any one of the aforementioned where at least one of the aforementioned metals constitutes the majority by weight of the alloy; a foam formed from polyurethane, polyethylene, ethylene vinyl acetate, polypropylene, polystyrene, polyvinyl chloride, oraerogels, regardless of whether the foam is open-celled or closed-celled.

According to some inventive embodiments, the pores 186 defined by walls 188 of the open area core 174 extend between faces 177 and 177'. In some embodiments, the walls 188 are treated to modify a property thereof such as hydrophobicity or surface energy to promote adhesion thereto. By way of example, cellulosics are prone to moisture uptake and are readily coated with a wax such as a paraffin, or a silicone to render the cellulosic more hydrophobic compared to a native state. Alternatively, the cellulosic is readily alkylated by conventional reactions such as those with chloroacetic acid. Sarymsakov, A. A et al., Chem. Nat. Compd. (1997) 33: 337. Metals are similarly coated with a primer or other corrosion inhibitor. Alternatively, metals or polymers are plasma treated to modify surface energies to facilitate adhesion thereto.

In certain inventive embodiments, the ratio of the thickness of a wall 188 to the maximal linear extent between faces 177 and 177' is between 0.01-10:1. A wall thickness ranges from 0.1 mm to 100 mm in such inventive embodiments.

According to some inventive embodiments, a fire retardant or intumescent layer 191 is attached to the exposed surface 193 of the first surface 176.

FIGS. 29A-29D show various embodiments of ways in which the first sheet 176 and the second sheet 178 are joined together to form a sealed edge 195A-195D, respectively according to the present disclosure. In some inventive embodiments an elastomeric gasket 196 is disposed between the first sheet 176 and the structural skin 16 at the 33C to make the edge 33C more water resistant. It is appreciated that a gasket is readily included in the other edge joinder 195A, 195B, and 195D. The gasket 196 enhances maintenance of the edge seal over a wider range of use conditions.

The cover 40 includes a cover body portion 92 and a first flange 96 that extends from the cover body portion 92. As shown in FIG. 1, the cover body portion 92 of the cover 40 may include a plurality of walls 94 from which the flange 96 extends such that the flange and the cover body portion 92 are in separate planes. According to embodiments, the first flange 96 of the cover 40 extends from the cover body portion 92 such that the cover 40 is a substantially planar component. The cover body portion 92 of the cover is configured to overlie the cavity 28 within the tray 20 and the plurality of walls 24, 24', 26, 26' of the tray 20. The first flange 96 of the cover 40, which extends from the cover body portion 92, is configured to extend beyond the plurality of walls 24, 24', 26, 26' of the tray 20. It is appreciated that the cover 40 is readily formed of traditional SMC or an open areas core sandwich structure as detailed in co-owned application publication WO2020/117717A1. It is further appreciated that in the formation of a cover 40 in some inventive embodiments that there is no need for a high gloss surface. The cover 40 in some inventive embodiments, has a cross section per FIG. 28 and edge treatments per one or more of FIGS. 29A-29D as detailed above with respect to the tray 20.

The shield 80 includes a shield body portion 82 and a second flange 86 that extends from the shield body portion 82. As shown in FIG. 1, the shield body portion 82 of the shield 80 may include a plurality of walls 84 from which the flange 85 extends such that the flange and the shield body portion 82 are in separate planes. According to embodiments, the second flange 86 of the shield 80 extends from the shield body portion 82 such that the shield 80 is a substantially planar component. The shield body portion 82 of the cover is configured to underlie the bottom 22 of the tray 20. The second flange 86 of the shield 80, which extends from the shield body portion 82, is configured to extend beyond the bottom 22 of the tray 20. Additionally, the second flange 86 of the shield 80 is configured to engage the first flange 96 of the cover 40.

Figure 2:
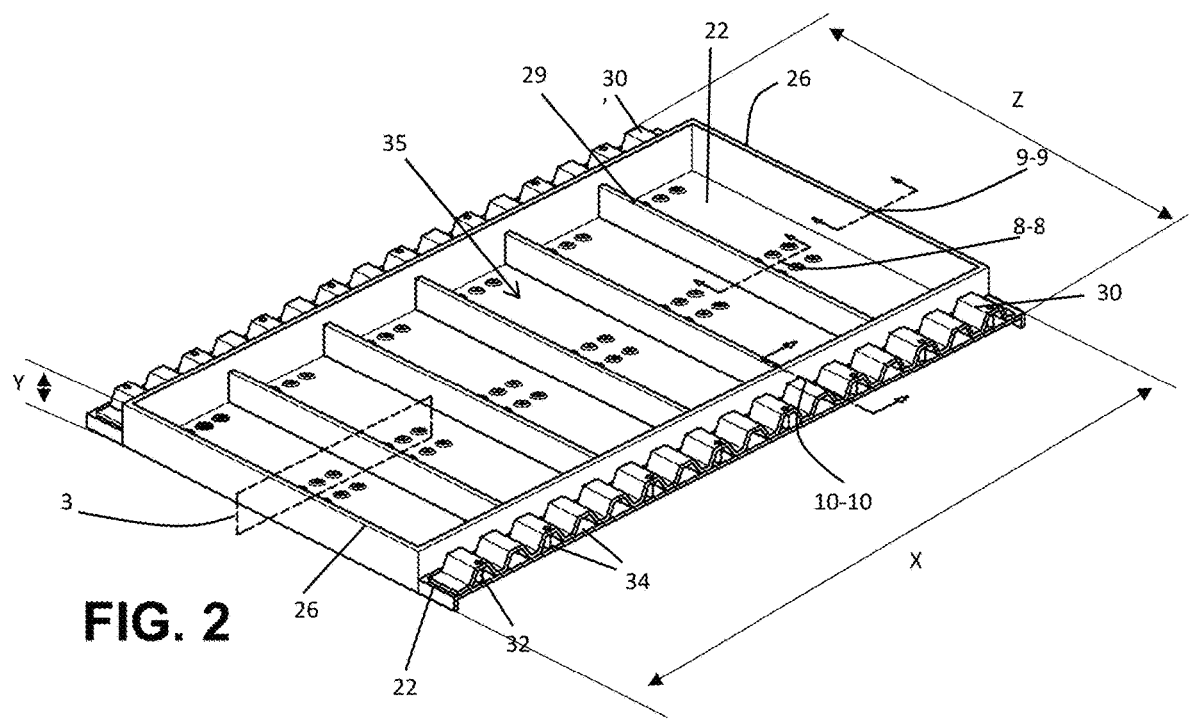
FIG. 2 is a perspective view of a tray and energy absorption components of a battery containment system assembled together according to an embodiment of the present invention.

As shown in FIG. 2, when the first and second energy absorption components 30, 30' are present and attached to the bottom 22 of the tray 20, a plurality of voids 34 are defined between the bottom 22 of the tray 20 and each of the first and second energy absorption components 30, 30'. According to certain inventive embodiments, the voids 34 are packed with a fire-retardant material or a fire-resistant material. In addition to providing fire resistance and extinguishing capabilities, the fire-retardant material or fire-resistant material packed in the voids 34 provides additional impact resistance. According to other inventive embodiments, any of the components of an inventive battery containment system 10 may have one or more coatings, shown generically at 35. The coating 35 illustratively includes materials that impart fire resistance, are phenolic in nature, electromagnetic interference-radiofrequency interference (EMI-RFI) resistance, or a combination of such coatings. It is appreciated that coating as used in this context is intended to include separate layers of material that are applied as a sheet material to a substrate of the system 10. That is, according to embodiments, the tray 20, the energy absorption components 30, 30', the cover 40, the shield 80, or a combination thereof are coated in a fire resistant, or a fire-retardant material. A fire-resistant material is one that is designed to resist burning and withstand heat and provide insulation to the substrate, while a fire-retardant material is designed to burn slowly and reduce the rate of flame spread. Intumescent fire-resistant materials work by expanding their volume from 15 to 30 times and generating an ash-like char layer that erodes as fire exposure continues. Expansion then occurs again with the number of times the process repeats itself dependent upon the thickness of the coating. For example, such fire resistant or fire retardant materials for packing in voids 34 or coating any of the tray 20, the energy absorption components 30, 30', the cover 40, and the shield 80 include any of the following: silicone, casein or vinyl resins, aluminum trihydrate or antimony oxide, ammonium polyphosphate, pentaerythritol, melamine derivatives, boric acid ($H_3BO_3$) and borax ($Na_2B_4O_7 \cdot 10H_2O$), disodium octaborate tetrahydrate ($Na_2B_8O_{13} \cdot 4H_2O$), dicyandiamide-formaldehyde-phosphoric acid, melamine-dicyandiamide-formaldehyde-phosphoric acid, poly(n-vinylpyrolidone), colloidal silica, magnesium hydroxide (MDH), monoammonium phosphate (MAP), aluminum hydroxide (ATH), carbonates and hydrogen carbonates, potassium carbonate, $Na_2WO_4$, $Na_2SnO_3$, $Na_2MoO_4$, ammonium polyphosphate, pentaerythritol, melamine, expandable graphite, or combinations thereof. Phenolic resins operative herein illustratively includes epoxy phenolic resins, and phenol formaldehyde resins that impart corrosion resistance and a mar resistance surface relative to the underlying substrate of the system 10. EMI-RFI shielding coatings operative herein illustratively include nickel coated glass mat; carbon fiber matting; copper or nickel paint; various metal foils, such as aluminum, nickel, iron, copper, and alloys thereof; and or combinations thereof with the proviso that the EMI-RFI shielding is grounded so as to function as a Faraday cage. It is further appreciated that coatings 35 in the form of sheets are readily applied as an underlying sheet below an inventive system 10 or are included as filler in the materials that are used to form the tray 20, the cover 40, and the shield 80.

According to certain inventive embodiments, the cover 40 is formed of reinforced sheet molding compound (SMC), a phenolic-SMC, epoxy, acrylonitrile butadiene styrene (ABS), polycarbonate, random-oriented fiber reinforced thermoplastic resin (FRTP), steel, or aluminum. Sheet molding compound (SMC) or sheet molding composite is a ready to mold fiber-reinforced polyester material primarily used in compression molding. SMC is a reinforced composite material that is manufactured by dispersing long strands (20-60 mm) of chopped glass fibers in a matrix of polyester resin. It is appreciated that fibers with long range order are also operative herein and include woven mats, continuous fibers, or sheet forms. Thermoplastic materials operative herein amenable to functioning as a fiber matrix illustratively include: poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, or block copolymers of any one of the aforementioned constituting the majority by monomer number. Reinforcing fibers and fillers operative herein illustratively include carbon fibers, glass fibers, aramid fibers, cellulosic fibers, or a combination thereof. In some inventive embodiments, the chopped fiber is glass fiber, alone or in combination with other types of fiber or reinforcing fillers. According to embodiments, the cover 40 is formed of glass fiber reinforced SMC. As noted above, a coating 35 is readily applied to a cover 40 in some inventive embodiments. According to embodiments, the material forming the cover 40 includes an EMI-RFI shielding filler which illustratively include nickel coated glass mat; carbon fiber matting; copper or nickel paint; various metal foils, such as aluminum, nickel, iron, copper, and alloys thereof; and or combinations thereof with the proviso that the cover 40 is grounded so as to function as a Faraday cage.

According to certain inventive embodiments, the shield 80 is formed of reinforced sheet molding compound (SMC), a phenolic-SMC, epoxy, acrylonitrile butadiene styrene (ABS), polycarbonate, random-oriented fiber reinforced thermoplastic resin (FRTP), steel, or aluminum. Sheet molding compound (SMC) or sheet molding composite is a ready to mold fiber-reinforced polyester material primarily used in compression molding. SMC is a reinforced composite material that is manufactured by dispersing long strands (20-60 mm) of chopped glass fibers in a matrix of polyester resin. It is appreciated that fibers with long range order are also operative herein and include woven mats, continuous fibers, or sheet forms. Thermoplastic materials operative herein amenable to functioning as a fiber matrix illustratively include: poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, or block copolymers of any one of the aforementioned constituting the majority by monomer number. Reinforcing fibers and fillers operative herein illustratively include carbon fibers, glass fibers, aramid fibers, cellulosic fibers, or a combination thereof. In some inventive embodiments, the chopped fiber is glass fiber, alone or in combination with other types of fiber or reinforcing fillers. According to embodiments, the shield 80 is formed of aramid fiber reinforced SMC, which is particularly well suited for resisting impalement by crash or road debris. As noted above, a coating 35 is readily applied to a shield 80 in some inventive embodiments. According to embodiments, the material forming the shield 80 includes an EMI-RFI shielding filler which illustratively include nickel coated glass mat; carbon fiber matting; copper or nickel paint; various metal foils, such as aluminum, nickel, iron, copper, and alloys thereof; and or combinations thereof with the proviso that the shield 80 is grounded so as to function as a Faraday cage.

According to certain inventive embodiments, the battery containment system further includes a seal 42 positioned between the cover 40 and the plurality of walls 24, 24', 26, 26' of the tray 20. The seal 42 may be provided on either of the cover 40 or the plurality of wall. The seal 24 is formed of an elastomeric material. The seal 42 ensures water tight engagement between the tray 20 and the cover 40 and also inhibits wear caused by rubbing between the tray 20 and the cover 40.

According to certain inventive embodiments, the tray 20 further includes internal divider walls 29, which divide the cavity 28 into sections of sub-cavities. The internal divider walls 29 extend from the bottom 22 of the tray 20 between the first side wall 24 and the second side wall 24'. It will be appreciated that the internal divider walls 29 could alternatively or additionally span between the first end wall 26 and the second end wall 26'. The internal divider walls 29 provide additional structural rigidity to the battery containment system 10 and provide support to batteries 50 positioned within the tray 20 to limit shifting of the batteries 50 within the tray 20. According to embodiments, the tray 20 also includes a through hole 27 defined in at least one of the walls 24, 24', 26, 26'. The through hole 27 allows a wire or cable 52 to be passed therethrough, such as a high voltage wire 52 for connecting the batteries 50 contained within the battery containment system 10 to the other systems of the hybrid or electric vehicle systems. In FIG. 1, the through hole 27 is defined in the first end wall 26; however it will be understood that a through hole 27 may be provided in any of the plurality of walls 24, 24', 26, 26', the cover 40, or the bottom 22 of the tray 20 based on design requirements and routing of a high voltage wire 52 for connecting the batteries 50 to other systems of the hybrid or electric vehicle.

According to embodiments, the tray 20 is formed of a reinforced sheet molding compound (SMC), epoxy, acrylonitrile butadiene styrene (ABS), polycarbonate, or random-oriented fiber reinforced thermoplastic resin (FRTP). Thermoplastic materials referred to herein include but are not limited to poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, or block copolymers of any one of the aforementioned constituting the majority by monomer number. Reinforcing fibers and fillers operative herein illustratively include carbon fibers, glass fibers, aramid fibers, cellulosic fibers, or a combination thereof. In some inventive embodiments, the chopped fiber is glass fiber, alone or in combination with other types of fiber or reinforcing fillers. According to embodiments, the tray 20 is formed of glass fiber reinforced SMC or carbon fiber reinforced SMC. According to embodiments, the material forming the tray 20 includes an EMI-RFI shielding filler which illustratively include nickel coated glass mat; carbon fiber matting; copper or nickel paint; various metal foils, such as aluminum, nickel, iron, copper, and alloys thereof; and or combinations thereof with the proviso that the tray 20 is grounded so as to function as a Faraday cage.

Figure 3:
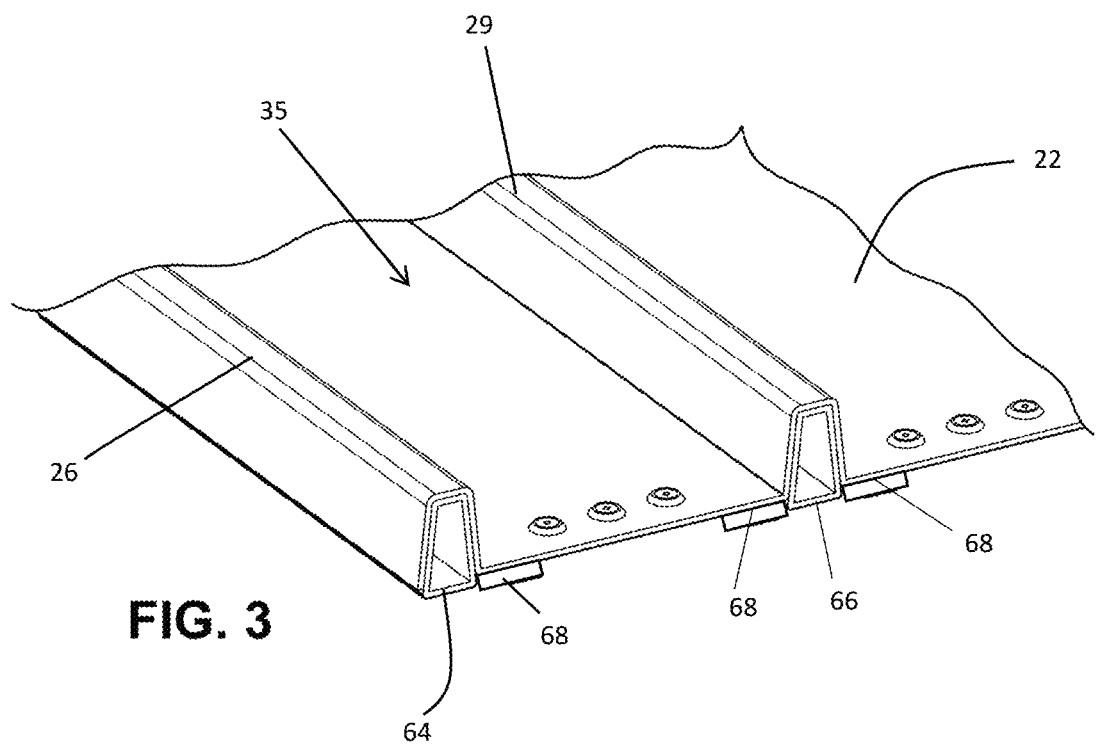
FIG. 3 is a detailed perspective view of a portion of the tray shown in the dashed oval 2 of FIG. 2.

According to embodiments, a battery containment system 10 further includes a frame 60 for reinforcing the tray 20. The reinforcing frame 60 includes members including any of a first and a second side member 62, 62', a first and a second end member 64, 64', and cross members 66. As shown in FIG. 1, the members 62, 62', 64, 64', 66 of the reinforcing frame 60 are any of T-shaped or L-shaped members or a combination thereof. In other words, the members 62, 62', 64, 64', 66 of the reinforcing frame 60 include upwardly extending portions and outwardly extending portions. The upwardly extending portions of the members 62, 62', 64, 64', 66 are configured to engage with the protrusions of the walls 24, 24', 26, 26', 29 that extend from the bottom 22 of the tray 20, while the outwardly extending or flange portions 68 of the members 62, 62', 64, 64', 66 are configured to engage with the bottom 22 of the tray 20 on a side of the bottom 22 opposite one of the walls 24, 24', 26, 26' of the tray 20, as shown in the detailed perspective view of FIG. 3. The reinforcing frame 60 is formed of any of reinforced polymer, such as those reinforced with glass fibers or carbon fibers, aluminum, or steel. According to embodiments, the members of the frame 60 are discrete, individual sections that remain as such until joined with the tray 20. According to other inventive embodiments, the members of the frame 60 are discrete, individually formed sections that are joined together prior to being joined with the tray 20. In yet another inventive embodiment, the reinforcing frame 60 is formed as a single frame comprising to joined members that is then joined to the tray 20.

According to certain inventive embodiments, the energy absorption components 30, 30' are formed of any of carbon fiber reinforced thermoplastic (CFRTP), aluminum, or steel. According to certain inventive embodiments, the energy absorption components 30, 30' are formed of a carbon fiber reinforced thermoplastic known as SEREEBO®™, having composition including Carbon fibers "Tenax" (registered trademark) STS40-24KS (average fiber diameter: 7 .mu.m, single yarn number: 24,000) manufactured by Teijin., Ltd., which had been cut to an average fiber length of 20 mm were used as carbon fibers. Nylon-6 resin A1030 manufactured by Unichika, Ltd. was used. In accordance with the method described in U.S. Pat. No. 8,946,342, there was manufactured a molding material precursor of the carbon fibers and the Nylon-6 resin, in which the carbon fibers had been randomly oriented in two-dimensions. The obtained molding material precursor was heated at 2.0 MPa for 5 minutes with a pressing device heated to 260 degree C. to obtain a CFRTP material.

Figure 4A:
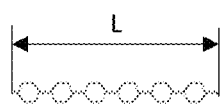
FIGS. 4A-4R show a side view of various configurations of an energy absorption component of a battery containment system according to embodiments of the present invention.

As shown in FIG. 1, the first and second energy absorption components 30, 30' each have a repeating shape of a predetermined geometry. As shown in FIGS. 4A-4R, the repeating shape of the first and second energy absorption components 30, 30' is any of a closed hexagon (FIG. 4A), a closed circle (FIG. 4E), a closed triangle (FIG. 4L), a closed oval (FIG. 4P), a closed square (FIG. 4N), a closed rectangle (FIG. 4Q), an open semi hexagon (FIGS. 4B, 4C, and 4D), an open semi-circle (FIG. 4F), and open semi oval (FIG. 4G), an open triangle (FIG. 4K), an open semi square (FIG. 4M), and open semi rectangle (FIG. 4R), and a sine wave (FIG. 4O). As shown in FIGS. 4H, 4I, 4J, 12A, and 12B the first and second energy absorption components 30, 30' are extruded or roll formed elongated forms with a continuous cross section. In some inventive embodiments, the continuous forms 30, 30' have internal partitions 170, 170' and in still other inventive embodiments, one or more of the compartments formed therein is filled with an energy absorbing foam to enhance the impact protection of the battery compartment against collision induced intrusions. Foams operative herein for beam filling illustratively include polyvinylchloride; polyurethanes; and those detailed in Canadian Pat. No. 860,386; and U.S. Pat. No. 4,158,087.

Figure 5A:
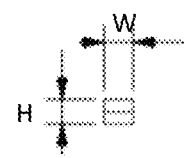
FIGS. 5A-5R show an end view of the configurations of an energy absorption component of a battery containment system of FIGS. 4A-4R, respectively.
Figure 5B:
Figure 5C:
Figure 5D:
Figure 5E:
Figure 5F:
Figure 5G:
Figure 5H:
Figure 5I:
Figure 5J:

According to embodiments, press molding enhances production efficiency and is therefore preferred over extruded or roll formed elongated forms. As shown in FIG. 4A the first and second energy absorption components 30, 30' have a length L measured from a first end to a second end. It will be readily understood that the various configurations of the first and second energy absorption components 30, 30' shown in FIGS. 4A-4R also have a length L measured from a first end to a second end, however the length L is not shown in all of the figures for clarity. FIGS. 5A-5R show end view of each of the first and second energy absorption components 30, 30' show in FIGS. 4A-4R, respectively. As shown in FIG. 5A the first and second energy absorption components 30, 30' have a width W and a height H. As with the length L, it will be understood that the width W and height H have not been shown in all of the figures for clarity. According to certain inventive embodiments, the length L of each energy absorption component 30, 30' is 5 to 5000 mm, the width W is 5 to 100 mm, and the height H is 5 to 100 mm. The length, L, width W, and height H of each energy absorption component 30, 30' generally corresponds to the overall length of the tray 20, height of the side walls 24, 24', and the width of a lip of the bottom 22 that extends beyond the walls 24, 24', 26, 26' of the tray 20 onto which the energy absorption components 30, 30' are attached.

Figure 7A:
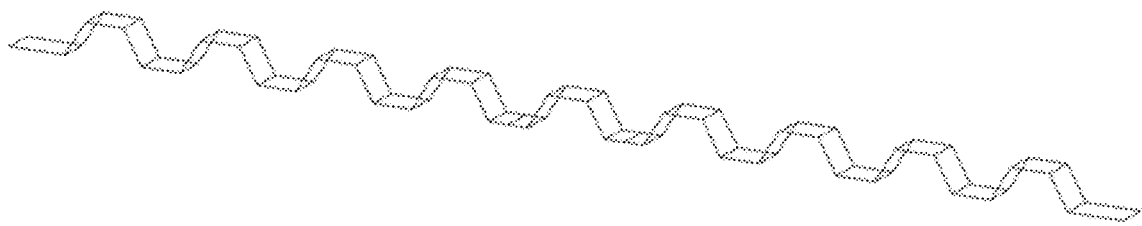
FIGS. 7A-7C show perspective view of various configurations of an energy absorption component of a battery containment system according to embodiments of the present invention.
Figure 7B:
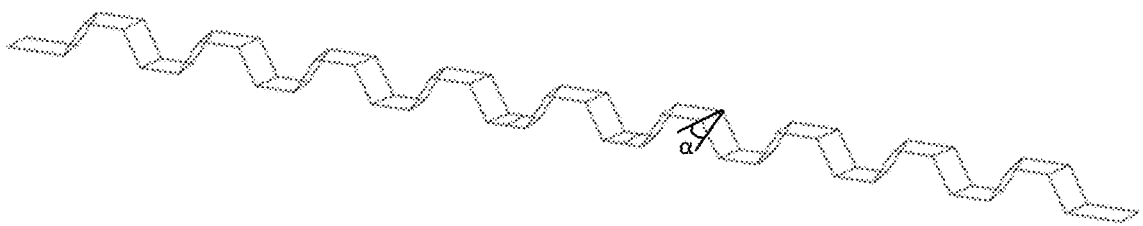
Figure 7C:
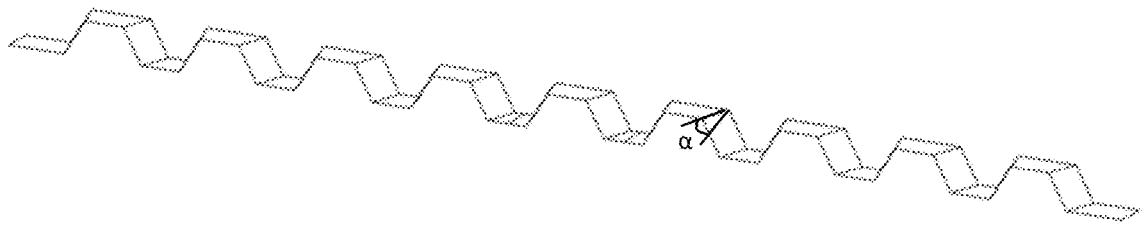
Figure 15:
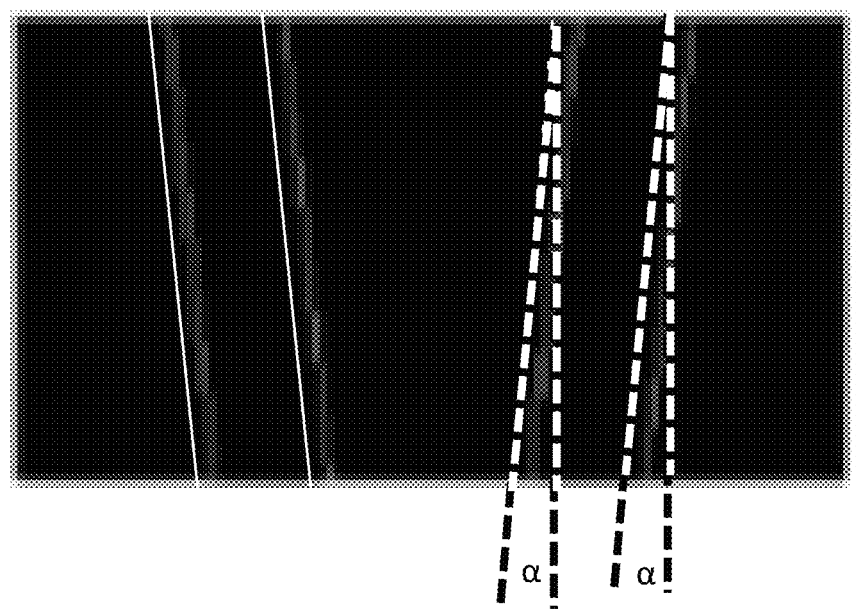
FIG. 15 is the top view of the energy absorption component of FIG. 14D with reference lines detailing angle α.

The geometry, including the length L, width W, and height H, along with internal dimensions including the length of each individual shape l, distance between each shape d, pitch p, wall thickness T1, T2, and wall angle α, of each of the energy absorption components 30, 30' may be tuned to achieve various characteristics depending on design considerations and requirements of a particular containment system 10. The length of each individual shape l, distance between each shape d, pitch p, and wall thickness T1, T2 are shown in FIGS. 6A and 6B, which are detailed views of FIGS. 4A and 4B. Wall angle α is shown in FIGS. 7B-7C and 15. Notably, the component shown in FIG. 7A is the same as the component shown in FIG. 4B. It will be understood that these dimensions are applicable to the various shapes of the first and second energy absorption components 30, 30' shown throughout FIGS. 4A-4R, but are not labeled in each figure for clarity. For example, as best shown in the exemplary shapes of FIGS. 4B, 4C, and 4D, the length l of each repeated shape and the distance d between each repeated shape can be increased or decreased to vary the strength characteristics of the first and second energy absorption components 30, 30'. According to certain inventive embodiments, the distance d between the repeated shapes is 0 to 300 mm. According to certain inventive embodiments, the length of each repeated shape is 20 to 300 mm. According to certain inventive embodiments, the pitch is 45 to 120 degrees. According to certain inventive embodiments, the thickness T1 is 0.25 to 5 mm and the thickness T2 is 0.25 to 10 mm in the case of steel. In the case of a carbon fiber composite material, thickness T1 is preferably 7 to 13 mm, and thickness T2 is preferably 14 to 24 mm. According to certain inventive embodiments, the thickness T2 is two times the thickness to T1. According to certain inventive embodiments, the wall angle α or tilt inward toward the voids 34 of the upward extensions of the repeated shapes is 0 to 25 degrees. For example, in FIG. 7A the wall angle α is 0 degrees, in FIG. 7B the wall angle α is 5 degrees, and in FIG. 7C the wall angle α is 12.5 degrees.

Figure 8:
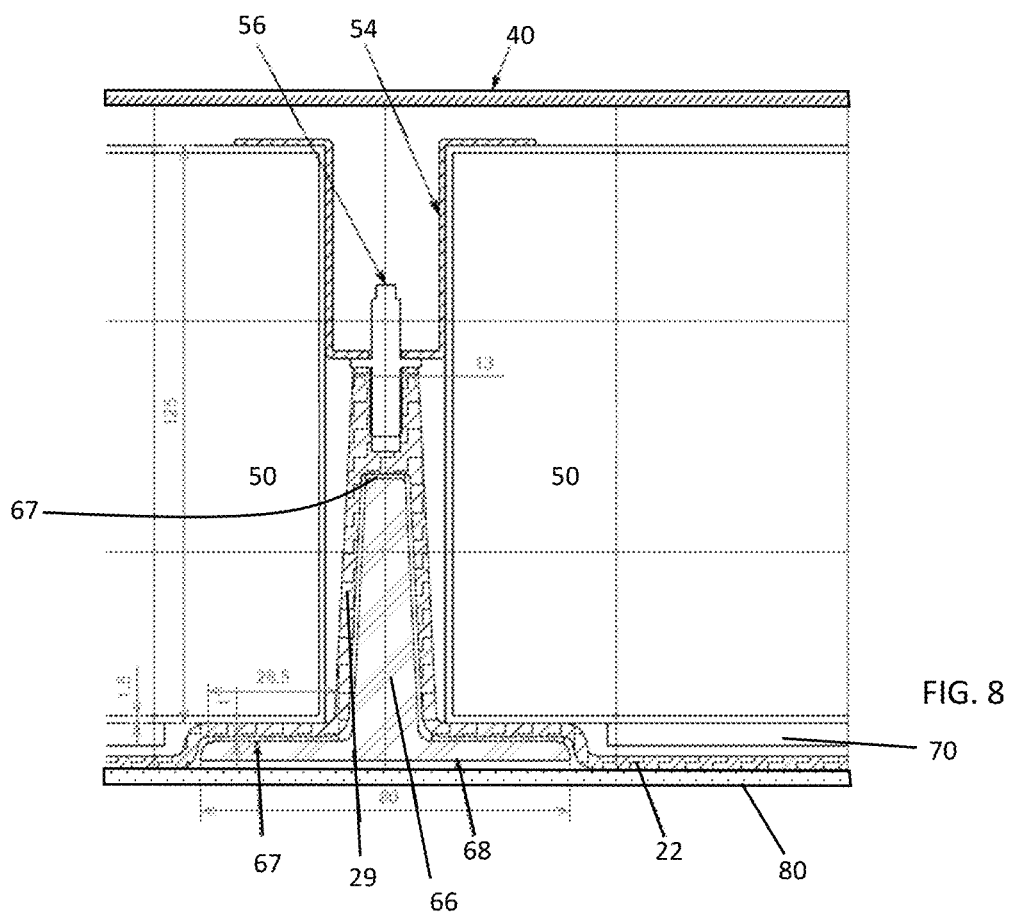
FIG. 8 is a detailed cross-sectional view of a portion of the battery containment system oriented along line 8-8 of FIG. 2.
Figure 9:
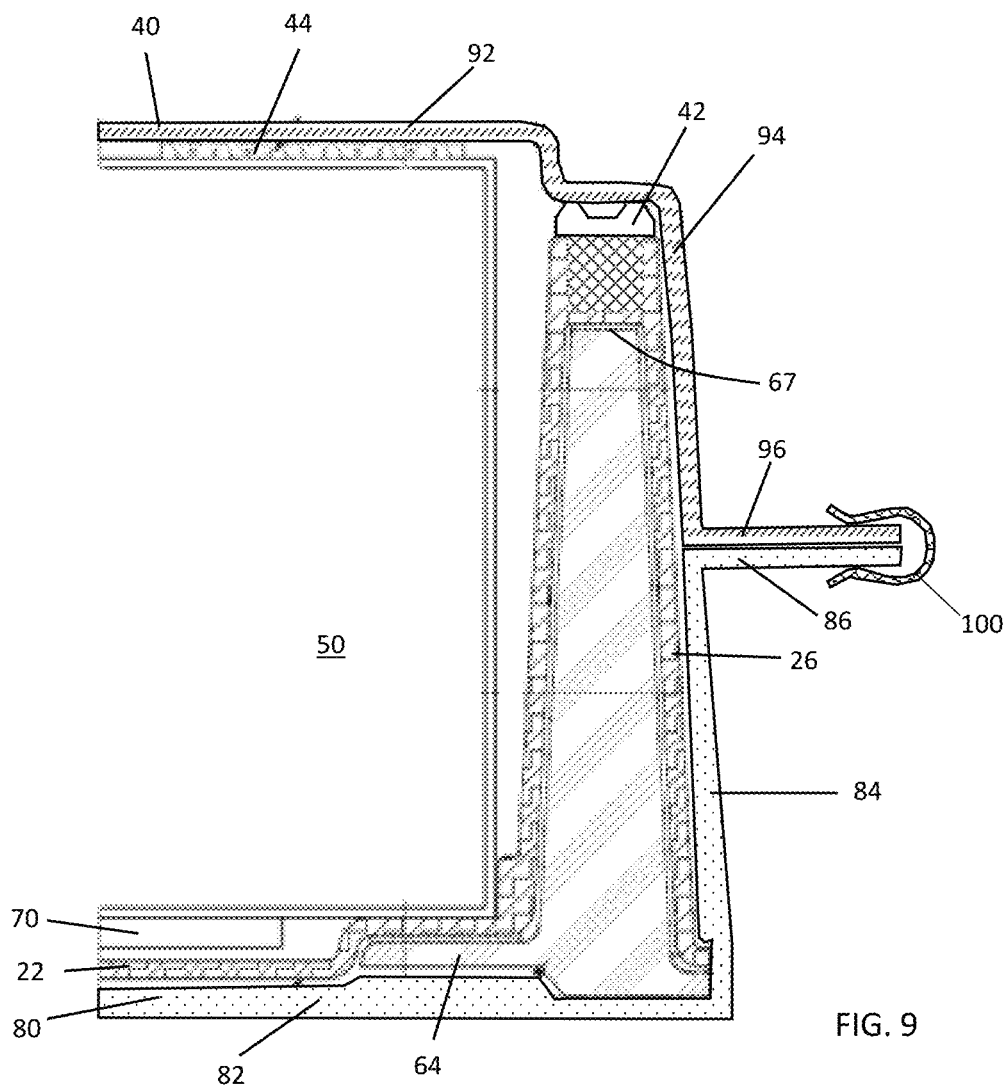
FIG. 9 is a detailed cross-sectional view of a portion of the battery containment system oriented along line 9-9 of FIG. 2.
Figure 10:
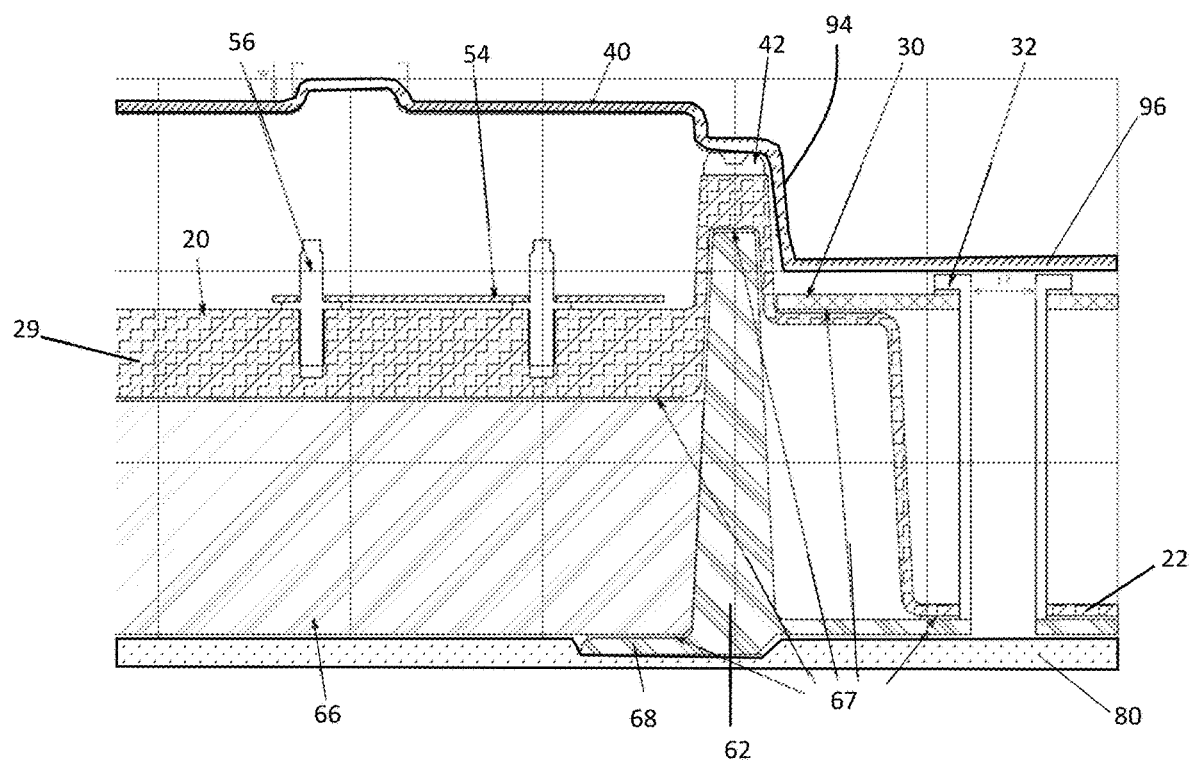
FIG. 10 is a detailed cross-sectional view of a portion of the battery containment system oriented along line 10-10 of FIG. 2.

Further details of an inventive containment system according to embodiments of the present invention are now described with reference to FIGS. 8-10 which are detailed cross-sectional views of the assembled system 10. For orientations purposes, the sections of the assembled system shown in FIGS. 8-10 are shown in FIG. 2 as along cut lines 8-8, 9-9, and 10-10, respectively, even though FIG. 2 does not show the cover 40 and shield 80 assembled around the tray 20. References numerals detailed with respect to these figures have the aforementioned meanings associated therewith. In the cross-sectional view of FIG. 8, a cross member 66 of a frame 60 is shown nested into a protrusion of an internal divider wall 29 of tray 20. The flanges 68 of the cross member 66 are in contact with the bottom 22 of the tray 20. According to certain inventive embodiments, an adhesive 67 is applied between the cross member 66 (or other members of the frame 60) and the second side of the tray 20. Batteries 50 are shown positioned on opposite sides of the internal divider wall 29 within the tray 20. According to certain inventive embodiments, the batteries 50 sit in direct contact with the bottom 22 of the tray 20. In further inventive embodiments, an intermediate layer of material, for example foam or another suitable shock absorbing material, is positioned between the batteries 50 and the tray 20, along the bottom 22 or the walls 24, 24', 26, 26' of the tray 20. As shown in FIG. 8, embodiments of the inventive battery containment system 10 include a temperature regulation system 70 that can be positioned around or near the batteries. The temperature regulation system 70 may include a water or coolant circulation system or a phase change material. As shown, the temperature regulation system 70 is posited in a downward protrusion formed in the bottom 22 of the tray 20, such that the batteries 50 are positioned on top of the temperature regulation system 70. According to certain inventive embodiments, the batteries 50 are held in a secured position by a bracket 54 that is secured to the tray 20 by a fastener 56. As shown in FIG. 8, the cover 40 is positioned above the batteries 50 and the shield 80 is positioned under the bottom 22 of the tray 20.

In the cross-sectional view of FIG. 9, an end member 64 of frame 60 is shown positioned within the protrusion of end wall 26 of the tray 20. According to certain inventive embodiments, an adhesive 67 is applied between the frame 60 and the second side of the tray 20. In FIG. 9, the temperature regulation system 70 is shown positioned under the battery 50. As shown in FIG. 9, the battery 50 is not secured by a bracket and fastener to the end wall 26 of the tray, however, according to still other inventive embodiments, the battery 50 may be secured to the end wall 26 using a bracket and fastener as shown in FIG. 8. In FIG. 9, the cover 40 overlies the battery 50 positioned within the cavity 28 of the tray 20 and overlies the walls 26 of the tray 20. A seal 42 is positioned between the wall 26 and the cover 40 to provide an air and water tight seal and to provide a buffer to resist wear caused by any potential rubbing between the cover 40 and the walls 26 of the tray 20. As shown in FIG. 9, the cover 40 includes wall 94 between the first flange 96 and the body portion 92 of the cover 40, making the first flange 96 and the body portion 92 in different planes. The shield 80 is positioned under the bottom 22 of the tray 20. As shown in FIG. 9, the shield 80 includes walls 84 that extend from the body portion 82 of the shield 80 and from which the second flange 86 extends. The first flange 96 and the second flange 86 engage one another in an abutting relationship and are joined together by a joiner clip 100. According to embodiments, a cushioning or shock absorbing material 44 such as foam is provided between the cover 40 and the batteries 50.

In the cross-sectional view of FIG. 10, a side member 62 and a cross member 66 of frame 60 are shown engaged with an interior divider wall 29 and side wall 24 of the tray 20. The cover 40 is shown engaged with the seal 42 along the side wall 24 of the tray 20. The lip 48 of the cover 40 is shown to extend the length of the side wall 24. Energy absorbing component 30 is shown positioned on an exterior side of the side wall 24. According to embodiments, the energy absorption components 30, 30' are attached to the bottom 22 of the tray 20 with an adhesive 67, alternatively or additionally the energy absorption components 30, 30' are attached to the bottom 22 of the tray 20 with a fastener 32, which may engage with a through hole defined in the bottom 22 of the tray and/or defined in a flange 68 of the side member 62 of the frame 60.

Figure 16:
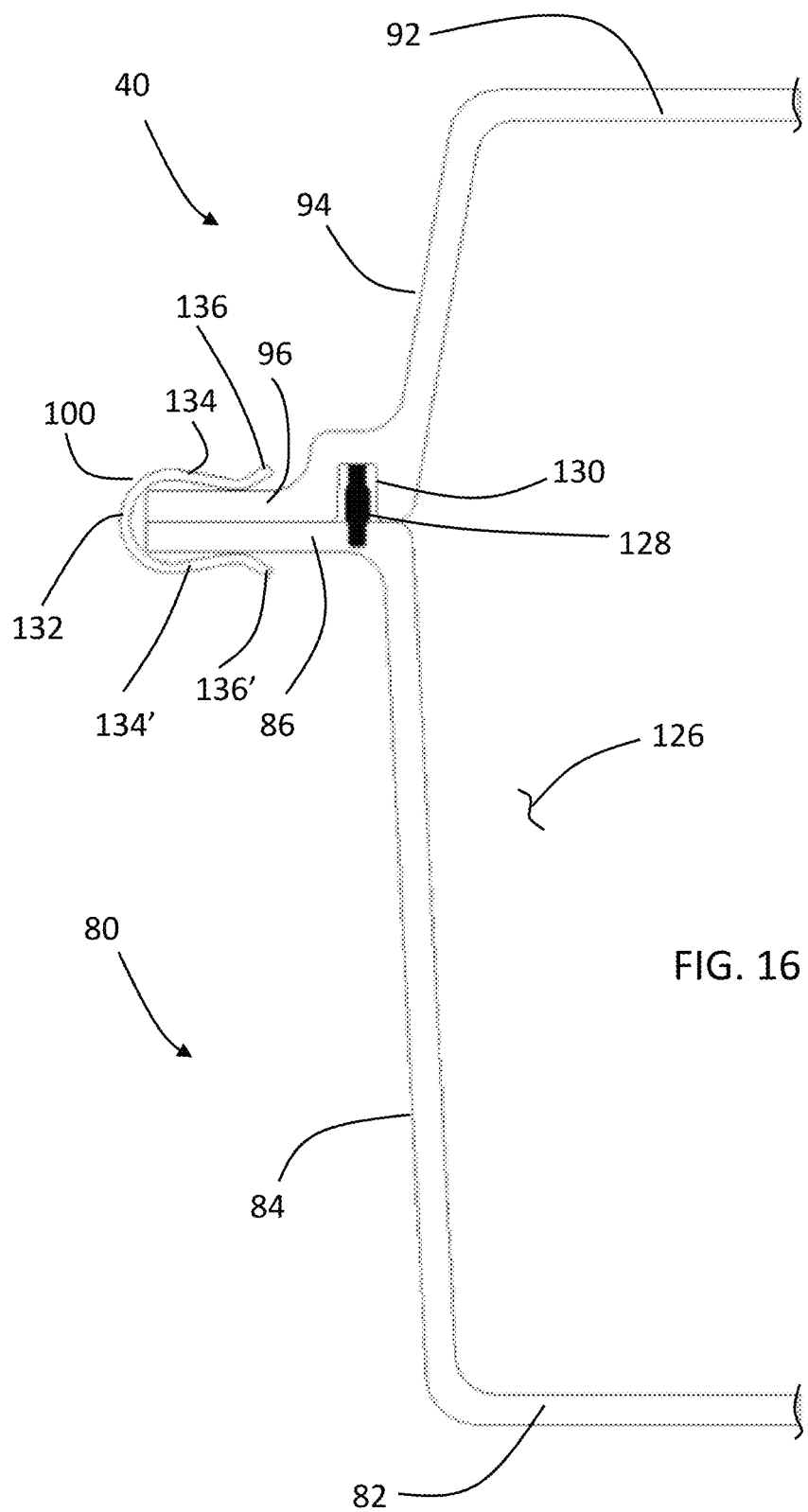
FIG. 16 is a cross sectional view of a cover and a shield of a battery containment system according to embodiments of the present invention.
Figure 17A:
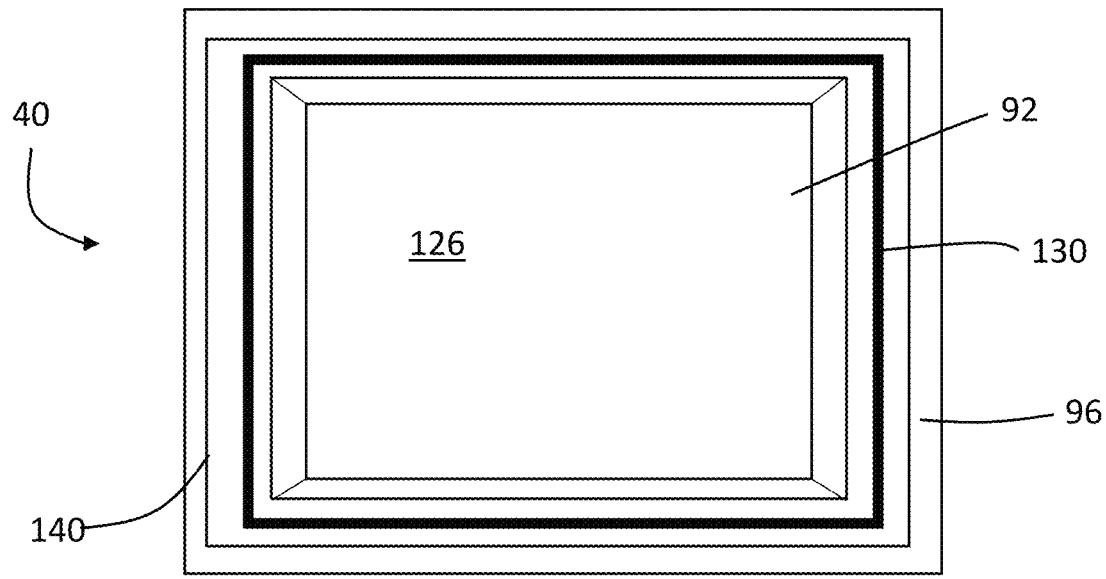
FIG. 17A is a bottom view of a cover of a battery containment system according to embodiments of the present invention.
Figure 17B:
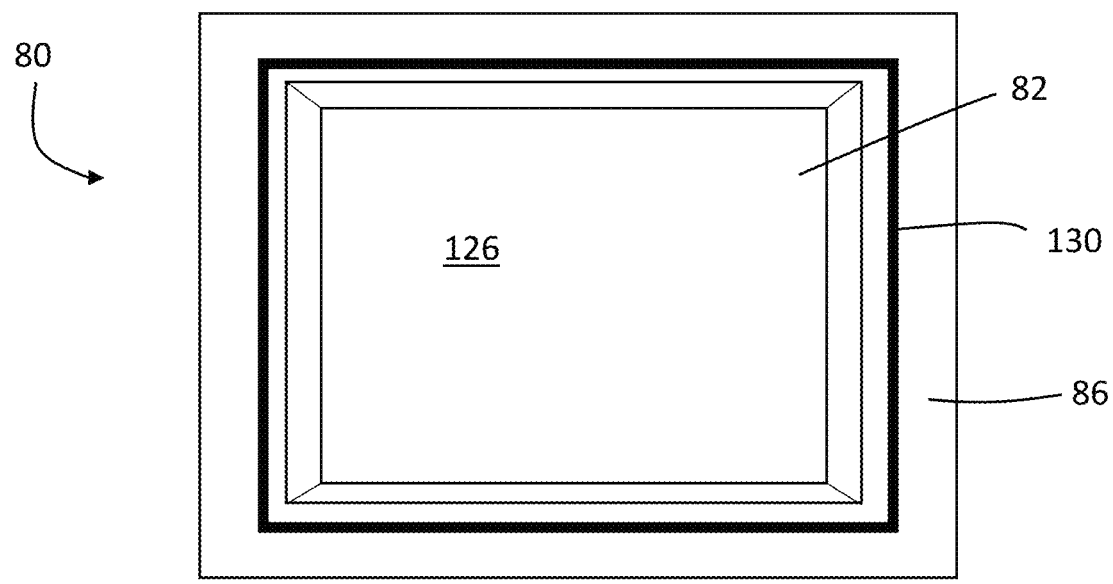
FIG. 17B is a top view of a shield of a battery containment system according to embodiments of the present invention.

FIG. 16 shows a cross sectional view of a cover 40 and a shield 80 of the present invention joined together by a joiner clip 100. In FIG. 16, the tray 20 of the inventive battery containment system 10 is not shown for clarity. As shown, joiner clip 100 having a C-shaped cross section joins the cover 40 and the shield 80 together. The cover 40, the shield 80, and the joiner clip 16 are configured to be assembled around the tray 20 in such a way as to form a high strength, light weight containment system 10 that provides impalement resistance, impact resistance, fire resistance, and fluid penetration prevention to contents contained within the construct 10, which according to embodiments is a plurality of batteries 50.

As described above, the first flange 96 of the cover and the second flange 86 of the shield 80 are configured to engage one another in abutting contact such that the cover 40 and the shield 80 define a cavity 126 therebetween. The cavity 126 is configured to receive and contain the tray 20, as described above. The joiner clip 100 is configured to engage the first flange 96 and the second flange 86 to join the cover 40 and the shield 80 together.

According to embodiments, a coating is applied to one or both of the cover 40 and the shield 80. The coating illustratively includes materials that impart fire resistance, are phenolic in nature, electromagnetic interference-radiofrequency interference (EMI-RFI) resistance, or a combination of such coatings. That is, according to embodiments, the coating is a fire resistant, or a fire-retardant material. A fire-resistant material is one that is designed to resist burning and withstand heat and provide insulation to the substrate, while a fire-retardant material is designed to burn slowly and reduce the rate of flame spread. According to embodiments, the cavity 126 that contains the tray 20 is additionally packed with an intumescent fire-resistant material, which works by expanding it volume from 15 to 30 times and generating an ash-like char layer that erodes as fire exposure continues, thereby cutting off oxygen that otherwise would fuel a fire. Expansion then occurs again with the number of times the process repeats itself dependent upon the thickness of the coating. For example, such fire resistant or fire retardant materials for coating or packing the cover 40, shield 80, and/or the cavity 126 defined therebetween include any of the following: silicone, casein or vinyl resins, aluminum trihydrate or antimony oxide, ammonium polyphosphate, pentaerythritol, melamine derivatives, boric acid ($H_3BO_3$) and borax ($Na_2B_4O_7.10H_2O$), disodium octaborate tetrahydrate ($Na_2B_8O_{13}.4H_2O$), dicyandiamide-formaldehyde-phosphoric acid, melamine-dicyandiamide-formaldehyde-phosphoric acid, poly(n-vinylpyrrolidone), colloidal silica, magnesium hydroxide (MDH), monoammonium phosphate (MAP), aluminum hydroxide (ATH), carbonates and hydrogen carbonates, potassium carbonate, $Na_2WO_4$, $Na_2SnO_3$, $Na_2MoO_4$, ammonium polyphosphate, pentaerythritol, melamine, expandable graphite, or combinations thereof. Phenolic resins operative herein illustratively includes epoxy phenolic resins, and phenol formaldehyde resins that impart corrosion resistance and a mar resistance surface relative to the underlying substrate of the construct 10.

Figure 18A:
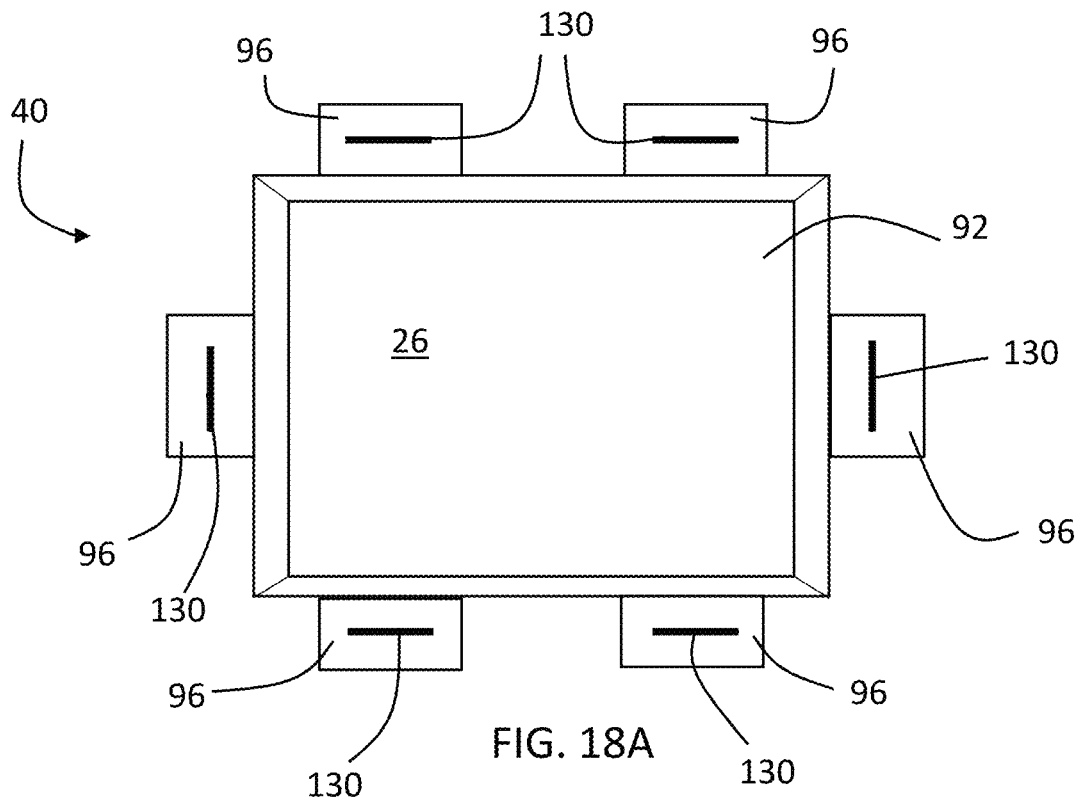
FIG. 18A is a bottom view of a cover of a battery containment system according to embodiments of the present invention.
Figure 18B:
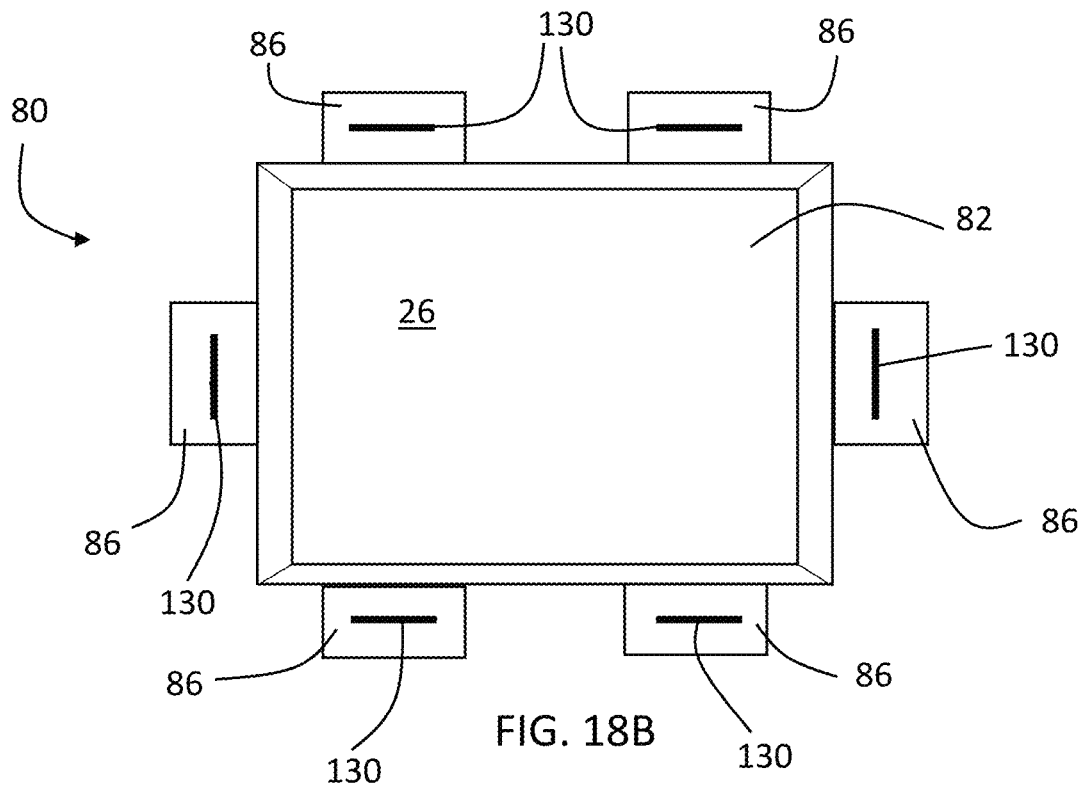
FIG. 18B is a top view of a shield of a battery containment system according to embodiments of the present invention.
Figure 19A:
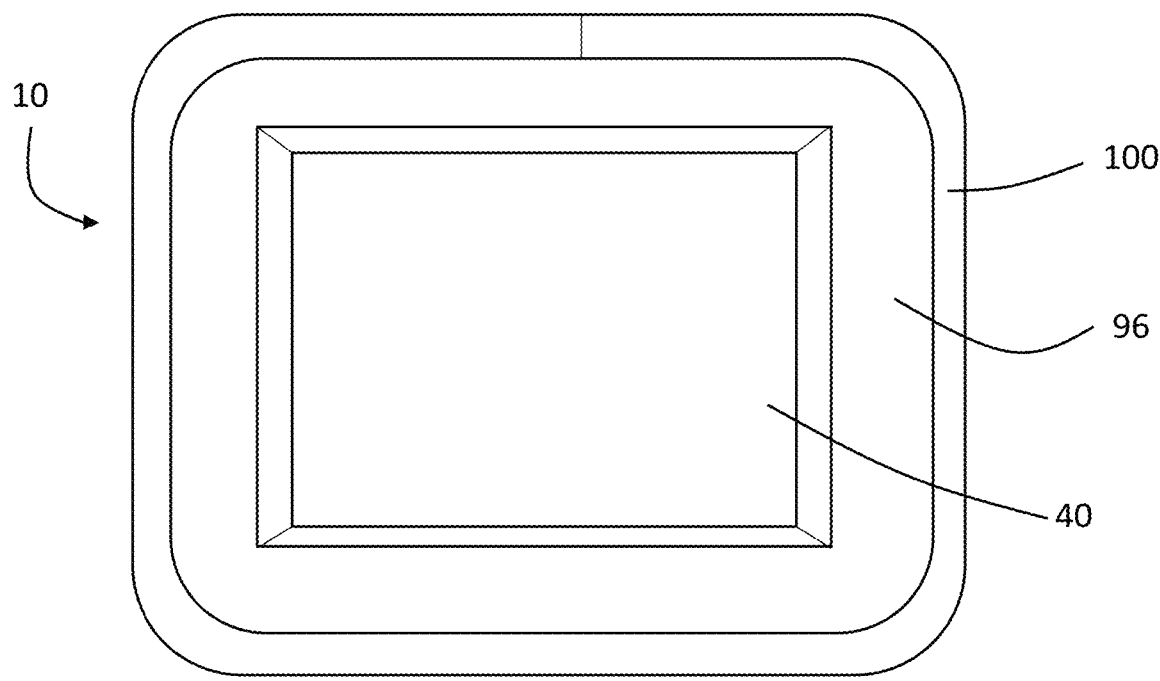
FIG. 19A is a top view of an assembled containment system according to embodiments of the present invention.
Figure 19B:
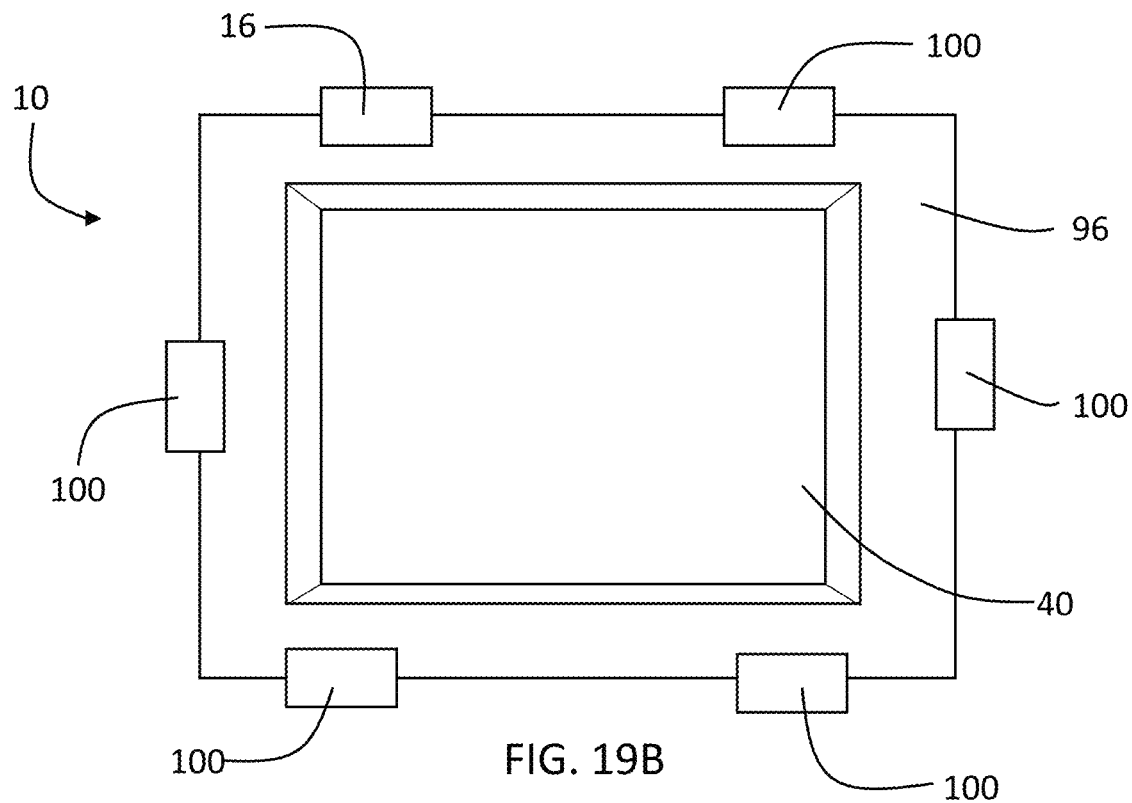
FIG. 19B is a top view of an assembled containment system according to embodiments of the present invention.
Figure 19C:
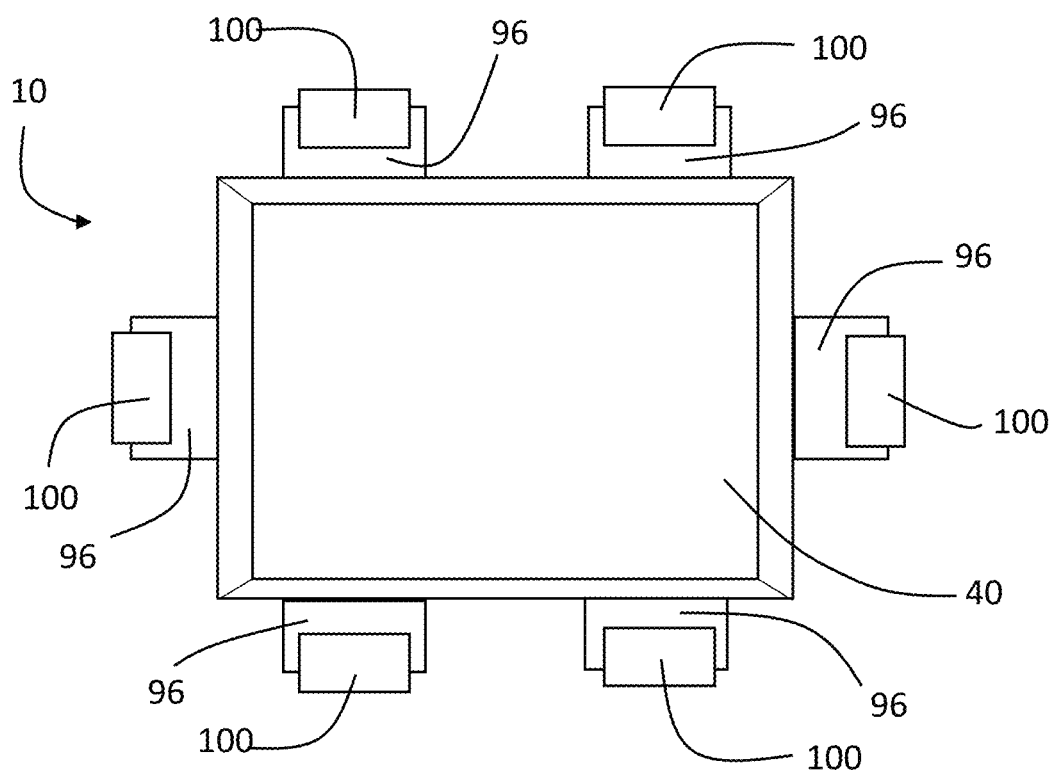
FIG. 19C is a top view of an assembled containment system according to embodiments of the present invention.
Figure 21:
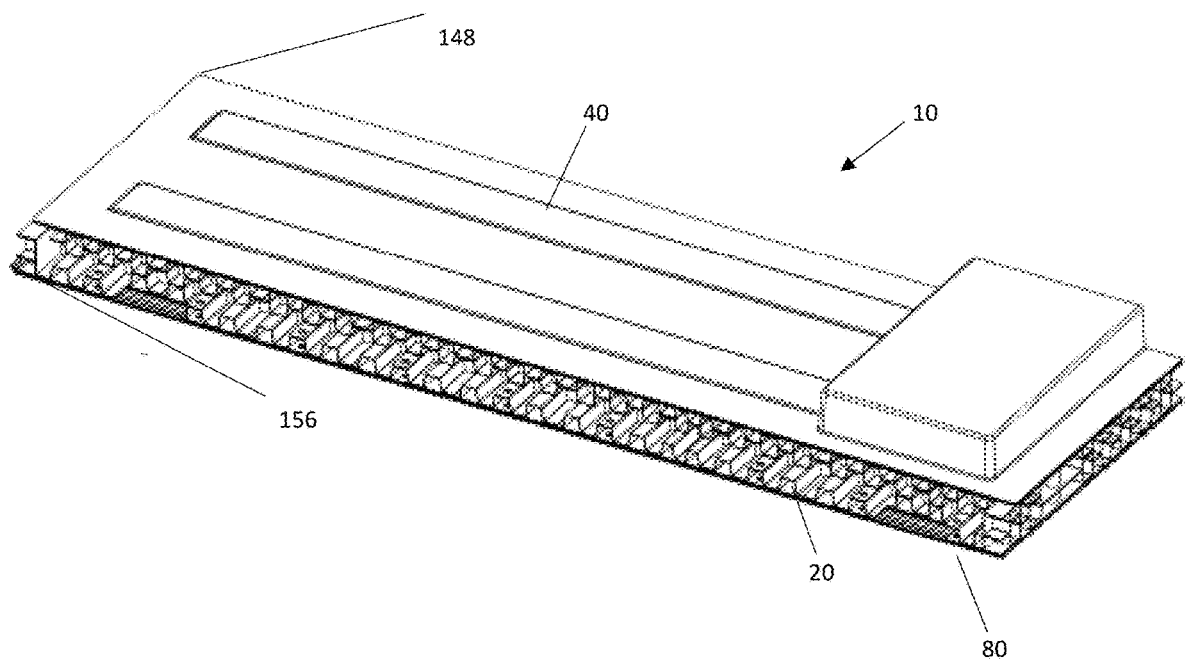
FIG. 21 is a top perspective view of a battery containment system according to embodiments of the present invention.
Figure 22:
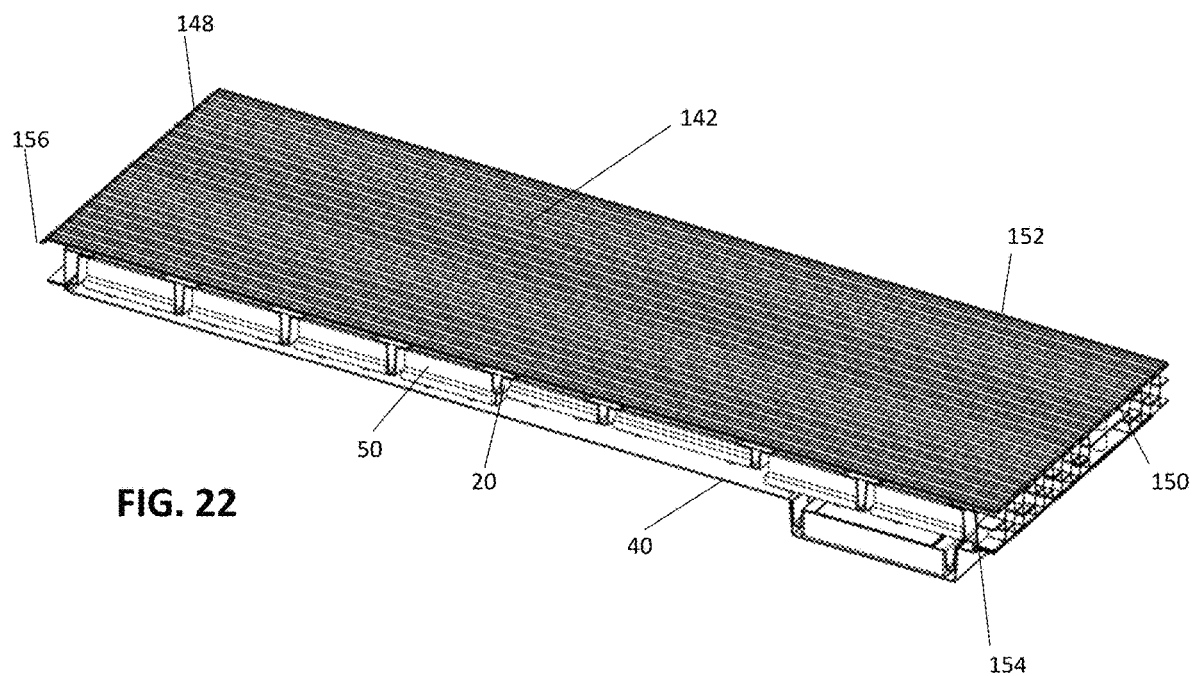
FIG. 22 is a bottom perspective view of the battery containment system of FIG. 21.
Figure 23:
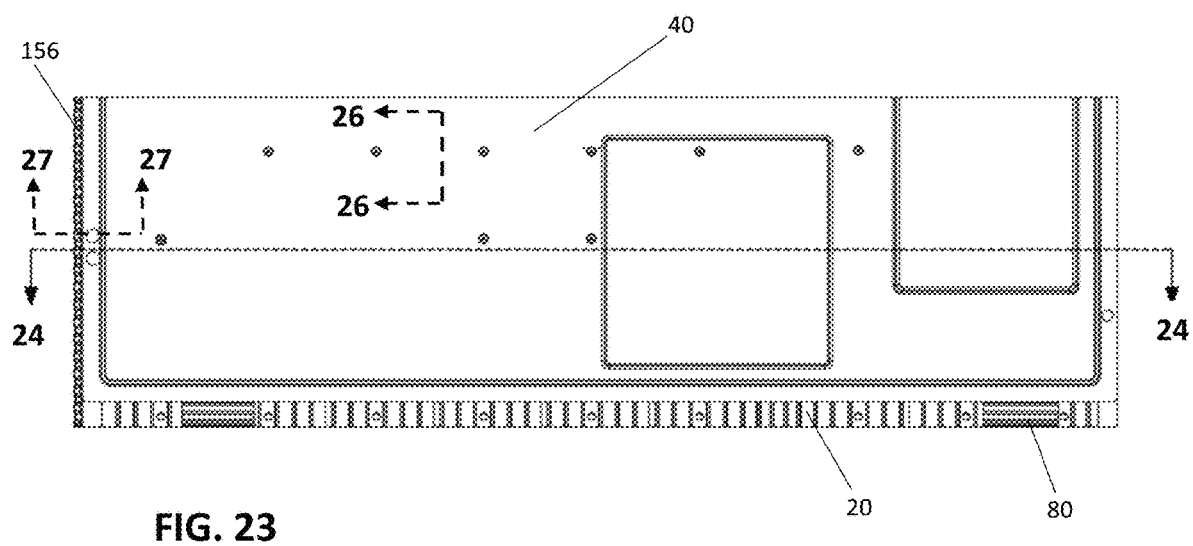
FIG. 23 is a top view of the battery containment system of FIG. 21.
Figure 24:
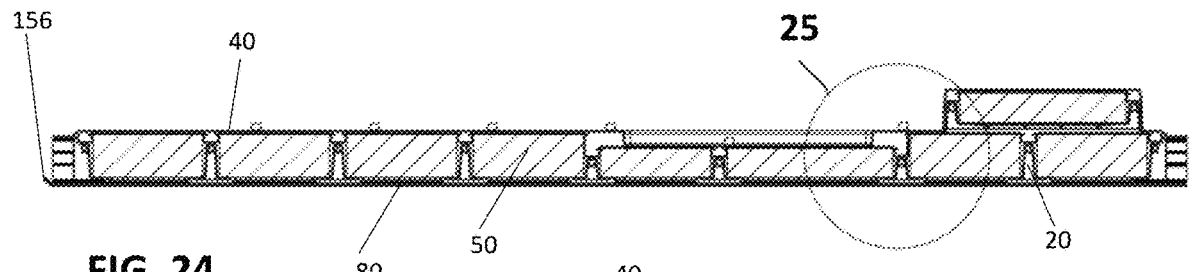
FIG. 24 is a cross sectional view of the battery containment system cut along line 24-24 of FIG. 23.
Figure 25:
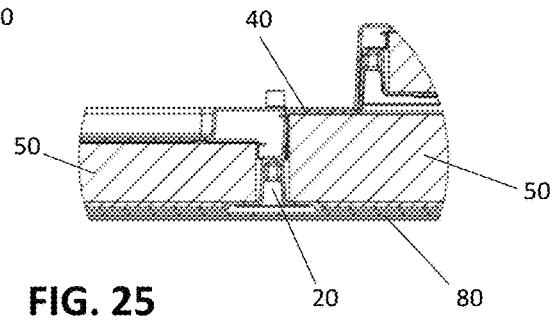
FIG. 25 is a detailed view of the battery containment system as shown in section 25 of FIG. 24.
Figure 26:
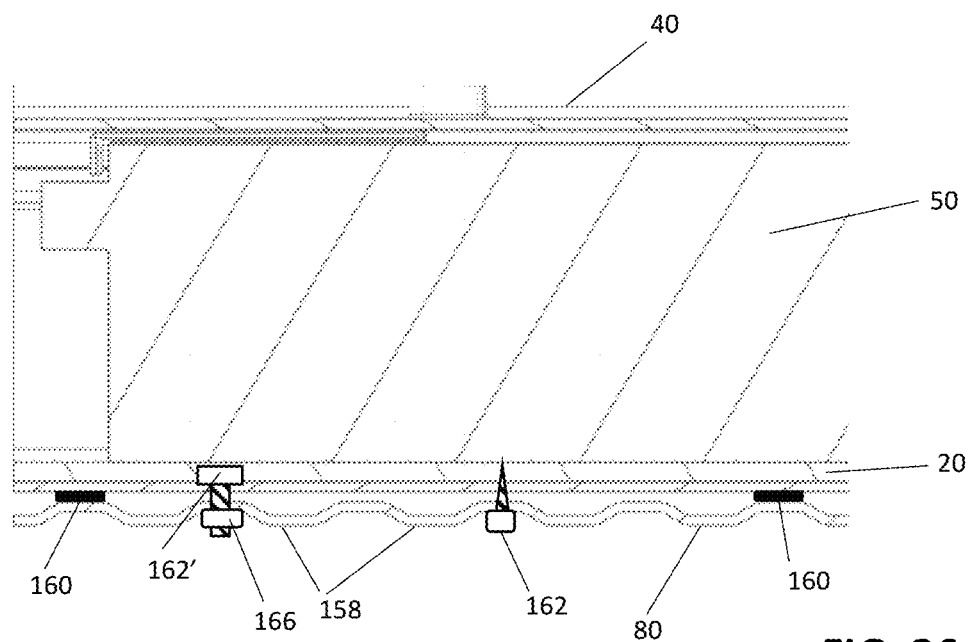
FIG. 26 is a cross sectional view of the battery containment system cut along line 26-26 of FIG. 23.
Figure 27:
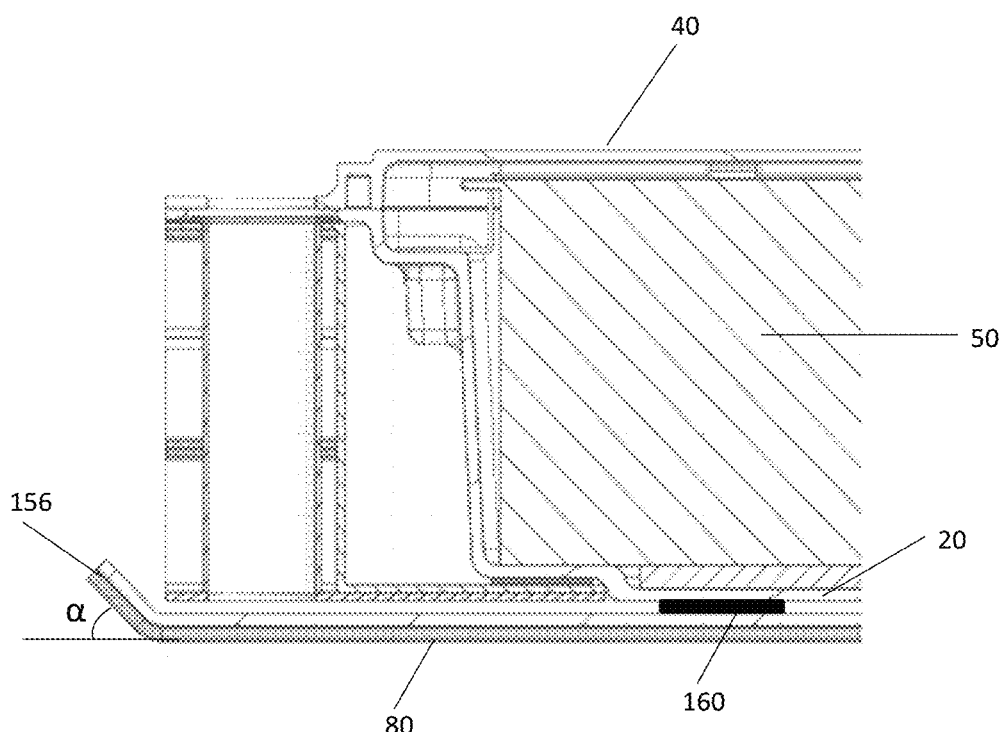
FIG. 27 is a cross sectional view of the battery containment system cut along line 27-27 of FIG. 23.

According to embodiments, the first flange 96 surrounds the perimeter of the cover. Similarly, according to embodiments, the second flange 86 surrounds the perimeter of the shield 80. According to embodiments, such as those shown in FIGS. 17A, 17B, 19A, and 19B, the flanges 96, 86 are each continuous in that they entirely cover the perimeter of the cover 40 and shield 80, respectively. According to other embodiments, such as those shown in FIGS. 18A, 18B, and 19C, the flanges 96, 86 are each made up of separate and discrete flange portions that non-continuously surround the cover 40 and shield 80, respectively. According to embodiments, in which the flanges 96, 86 are continuous and entirely surround the cover 40 and shield 80, the joiner clip 100 is either a single continuous joiner clip, as shown in FIG. 19A, that also entirely surrounds the cover 40 and shield 80, or the joiner clip 100 is a plurality of separate and discrete joiner clips, as shown in FIG. 19B, positioned at separate locations along the first flange 96 and the second flange 86 to non-continuously surround the cover 40 and the shield 80. According to embodiments, in which the flanges 96, 86 are each made up of separate and discrete flange portions that non-continuously surround the respective cover 40 and shield 80, the joiner clip 100 is a plurality of separate and discrete joiner clips positioned at separate locations along the first flange 96 and the second flange 86 to non-continuously surround the cover 40 and shield 80, as shown in FIG. 19C.

As shown in FIGS. 16 and 20A-20D, the joiner clip 100 includes a base section 132 and a pair of jaws 134, 134' extending from the base 132 section each jaw 134, 134' of the pair of jaws having a free end 136, 136', respectively. According to embodiments, the base section 132 is curved or square, as shown in FIGS. 20C-20D and 20A-20B, respectively. According to embodiments, one or both of the jaws 134, 134' are straight or feature a curve such that the free ends 136, 136' of each of the jaws 134, 134' are flared away from one another, such as shown in FIGS. 20A and 20C-5D and 20B, respectively. The flared free ends 136, 136' facilitate easy application of the joiner clip 100 onto the flanges 96, 86. That is, to apply the joiner clip 100, the flanges 96, 86 are positioned between the free ends 136, 136' of the joiner clip and the joiner clip 100 is pushed or pounded onto the flanges 96, 86, thereby eliminating the need for a special tool for separating the jaws 134, 134'. The flared free ends 136, 136' also reduce wear on the composite material of the flanges 96, 86 by ensuring that the free ends 136, 136' do not rub on the flanges 96, 86.

According to embodiments, the free ends 136, 136' of each of the jaws 134, 134' are biased toward one another. Thus, when the joiner clip 100 is engaged with the flanges 96, 86, such that the flanges 96, 86 are positioned between the jaws 134, 134' of the joiner clip 100, the joiner clip applies a compressive force to the first flange 96 and the second flange 86 to join the cover 40 and the shield 80 together. According to embodiments, the joiner clip is formed of a metal, such as spring steel, a thermoplastic, or an elastomeric material. Embodiments in which the joiner clip is formed of an elastomeric material provide the additional benefit of sealing the cover 40 and shield 80 while also joining them together. According to embodiments, the joiner clip 100 also includes at least on barb positioned on an inner surface of at least one of the jaws 134, 134'. The barb or barbs 138 are configured to dig into the composite material of the flanges 96, 86 or may engage with a groove 140 formed in the flanges to prevent the joiner clip 100 from falling off of or being easily removed from the flanges 96, 86.

According to embodiments, the containment construct 10 also includes a barrier material 128 positioned between the first flange 96 and the second flange 86. According to embodiments, the barrier material 128 acts as a seal and/or a connector between the first cover 40 and the shield 80 to limit movement or slippage between the cover 40 and the shield 80. According to embodiments, the barrier material 128 is any of an adhesive, a gasket, or a connector. In some embodiments, such as that shown in FIG. 16, at least one of the first flange 96 and second flange 86 define a channel 130 that is configured to receive and retain the barrier material 128. The channel 130 may be a continuous channel or may be a plurality of discrete channels spaced along the length of the flanges 96, 86 at spaced apart positions. According to embodiments in which at least one of the flanges 96, 86 includes a channel, the barrier material 128 is placed in the channel 130 before the flanges 96, 86 are brought into contact with one another. According to embodiments, in which both flanges 96, 86 define a channel 130 therein, the barrier material 128 is placed in the channel 130 of for example the first flange 96 and then the second flange 86 is brought into contact with the first flange 96 and the barrier material. In such embodiments, the barrier material 128 can be used as a position locator for ensuring that the first flange 96 and second flange 86 are properly positioned relative to one another. Additionally, once assembled, the barrier material 128 ensures that the cover 40 and the shield 80 remain properly positioned relative to one another during use, by preventing slippage, which in turn reduces wear on the parts. It will also be understood that when the barrier material 128 is a gasket, the barrier material may act to seal the cover 40 and shield 80 in water tight engagement and act to locate and retains the cover 40 and shield 80 relative to one another.

According to certain inventive embodiments, at least one of the cover 40 and shield 80 includes a through hole defined in at a wall 94, 84 or body 92, 82, respectively. The through hole allows a wire or cable to be passed therethrough, such as a high voltage wire for connecting the batteries contained within the battery containment construct 10 to the other systems of the hybrid or electric vehicle systems.

According to certain inventive embodiments, a containment system 10 has dimensions suitable to contain batteries 50 of an electric or hybrid vehicle. For example, embodiments of the inventive tray 20 have a length X measured from the first end wall 26 to the second end wall 26' of the tray 20, a width Z measured from the first side wall 24 to the second side wall 24' of the tray 20, and a height Y measured from the second side of the bottom 22 of the tray 20 to the top of the walls 20, 24', 26, 26'. The cover 40 and the shield 80 are sized such that they fit snuggly to the tray 20. According to embodiments, the overall dimensions of the assembled battery containment system 10 are a height from the bottom of the shield 80 to the top of the cover 40 of 100 to 500 mm, an overall flange to flange length of 100 to 5000 mm, and an overall flange to flange width of 100 to 3000 mm. According to embodiments, multiple layers of batteries 50 are stacked within the containment system 10, resulting in taller containment systems. According to embodiments, multiple layers of containment systems 10 are stacked.

Referring now to FIGS. 21-27, a battery containment system 10 according to embodiments of the present disclosure are shown. According to embodiments, a puncture resistant shield 80 includes a shield body portion 142 that has a first surface 144 and an oppositely opposed second surface 146 both bounded by a first end 148 and a second end 150 and a first side 152 and a second side 154 that each extend from the first end 148 to the second end 150. The puncture resistant shield 80 additionally includes a first ramp 156 extending from the first end 148 of the shield body portion 142 at a first angle α, which according to embodiments is an angle of 10 to 90 degrees. The puncture resistant shield 80 is configured to be attached to the battery containment system 10 such that the shield body portion 142 underlies the tray 20.

According to embodiments, the ramp 156 that extends from the first end 148 of the shield body portion 142 is integrally formed with the shield body portion 142. According to embodiments, the ramp 156 extends the entire length of the first end 148 of the shield body portion 142, that is the ramp 156 extends from the first end 148 of said shield body portion 142 from the first side 152 to the second side 154 of said shield body portion 142. According to embodiments, the puncture resistant shield 80 is configured to be attached to a battery containment system 10 such that first ramp 156 is positioned towards a front of the vehicle. According to embodiments, first ramp 156 is configured to be angled upwards towards said battery containment system 10 when said puncture resistant shield 80 is attached to the battery containment system 10. Such positioning and orientation of the first ramp 156 of the shield 80 allows the ramp 156 to further protect batteries 50 contained in the containment system 10 by deflecting road and crash debris that the vehicle may encounter when traveling in a forward direction. According to embodiments, the shield 80 additionally includes at least one additional ramp extending from at least one of the second end 150, the first side 152, and the second side 154 of the shield body portion 142.

According to embodiments, the puncture resistant shield 80 is configured to be attached to the battery containment system 10 using an adhesive 160 applied between the first surface 144 of the shield body portion 142 and a lower surface 22 of the of the tray 20. According to embodiments, the puncture resistant shield 80 is configured to be attached to the battery containment system 10 by a plurality of fasteners 162, 162' that extend through said shield body portion 142 through a plurality of through holes formed in said shield body portion 142. According to embodiments, such through holes may be formed in the material of the shield body portion 142 when the SMC material is laid up or may be formed subsequently by a drilling or stamping process. The plurality of fasteners 162 for example may include screws or bolts that are inserted through the shield body portion 142 such that the threaded end is secured within the battery containment system 10. Alternatively, the plurality of fasteners 162' for example may include bolts that have their heads embedded in the battery containment system and their threads exposed downward for insertion through the holes formed in the shield body portion 142. In such an instance, nuts 166 or other suitable securing devices are installed onto the threaded portions of the embedded bolts 162' to secure the shield 80 to the battery containment system 10.

The present invention is further detailed with respect to the following non-limiting examples. These examples are exemplary of specific embodiments of the present invention and not intended to limit the scope of the appended claims.

EXAMPLES

Figure 11:
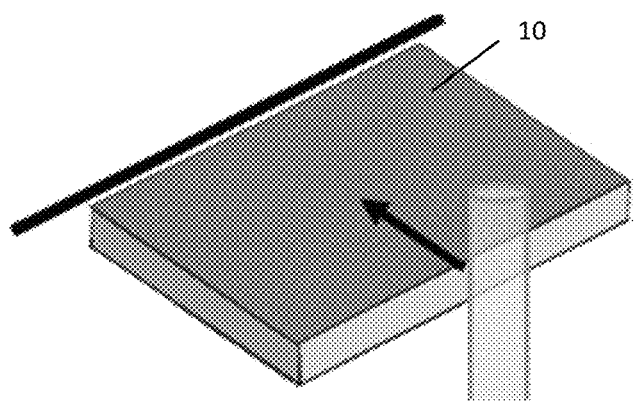
FIG. 11 is a schematic drawing of a pole test conducted on embodiments of the inventive battery containment system.
Figure 12A:
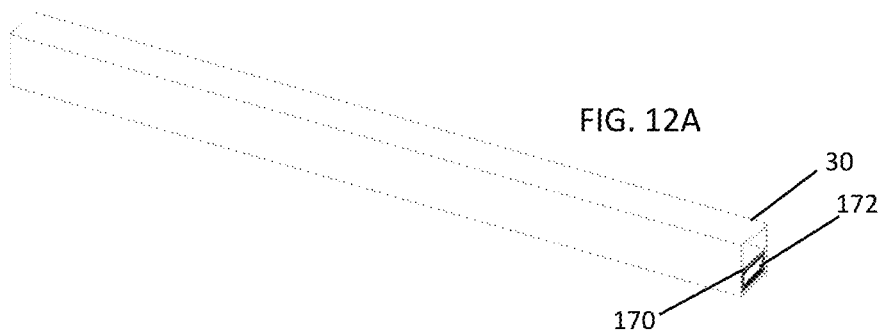
FIGS. 12A and 12B are perspective views of an energy absorption component according to embodiments of the present invention.
Figure 12B:
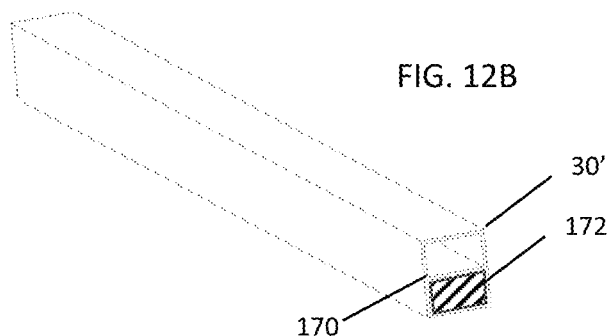
Figure 13A:
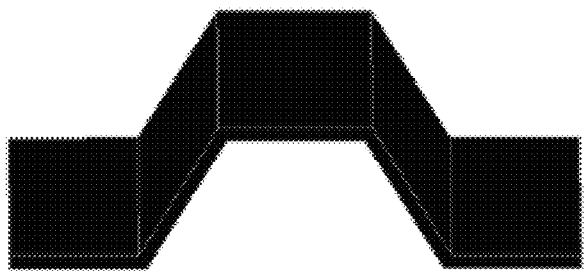
FIGS. 13A-13D are a front perspective view, a perspective view, a front view, and a top view, respectively of a portion of an energy absorption component according to embodiments of the present invention.
Figure 13B:
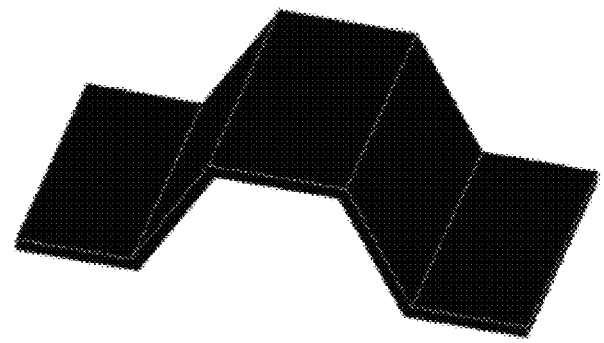
Figure 13C:
Figure 13D:
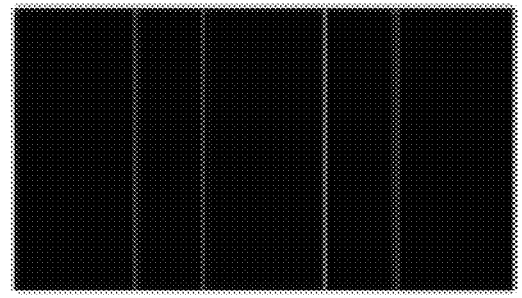
Figure 14A:
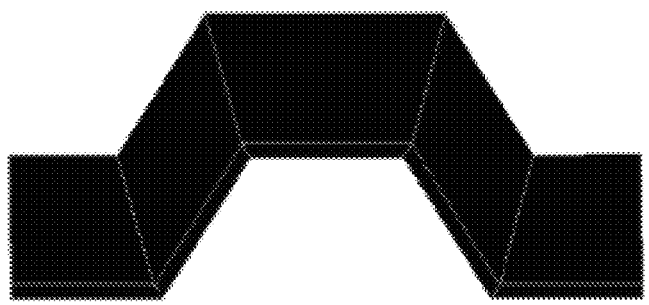
Figure 14A:
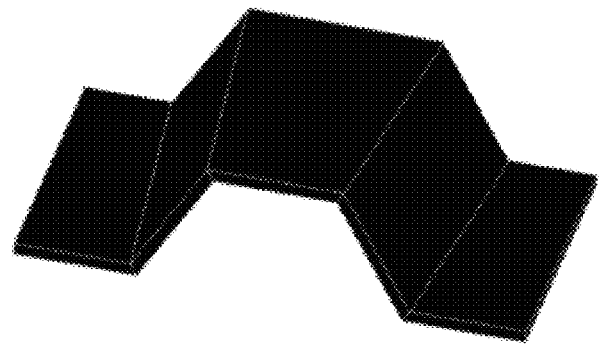
Figure 14C:
Figure 14D:
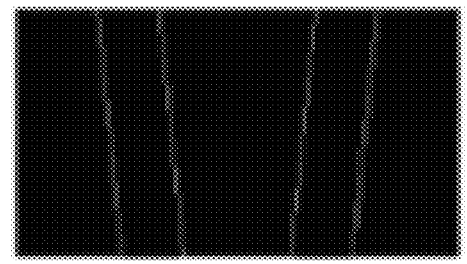

Embodiments of the inventive battery containment system 10 were constructed having various forms of the first and second energy absorption components 30, 30'. These battery containment systems 10 were subjected to impact testing using a quasi-static load by a 10 inch (25 cm) diameter rigid column located at the center of the system and traveling perpendicular into a predominate longitudinal or lateral edge of the battery containment system 10 as shown in the schematic in FIG. 11.

In a first example, battery containment systems 10 including energy absorption components 30, 30' formed of steel (SPFC590) having various geometries are tested for comparison. In this example, the containment systems are subjected to 250 J impacts at an impact angle of 90 degrees. As shown in Table 1, different repeating shapes are tested as well as different thicknesses T1 and T2 and pitches p. The mass of each component and the deformation results of the impact testing are reported in Table 1.

TABLE 1

Figure 4B:
Figure 4C:
Figure 4D:
Figure 4E:
Figure 4F:
Figure 4G:
Figure 4H:
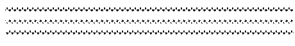

| Analysis File | Shape/ Reference FIG. | T1 mm | T2 mm | Mass kg | pitch mm | Deformation mm |
|---|---|---|---|---|---|---|
| EA-1 | FIG. 4A | 0.73 | 1.46 | 1.33 | 104.5 | 11.9 |
| EA-2 | FIG. 4B | 0.93 | — | 1.33 | 207.8 | 18.3 |
| EA-3 | FIG. 4C | 1.01 | — | 1.33 | 323.3 | 28.4 |
| EA-4 | FIG. 4D | 1.11 | — | 1.33 | 577.3 | 49.6 |
| EA-5 | FIG. 4E | 0.71 | 1.41 | 1.33 | 90 | 8.1 |
| EA-7 | FIG. 4F | 0.89 | — | 1.33 | 180 | 16.3 |
| EA-12 | FIG. 4G | 1.08 | — | 1.32 | 360 | 44 |
| EA-9 | FIG. 4H | 0.22 | — | 1.33 | — | >70 |

TABLE 1-continued

Figure 4I:
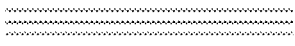
Figure 4J:
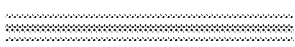

| Analysis File | Shape/Reference FIG. | T1 mm | T2 mm | Mass kg | pitch mm | Deformation mm |
|---|---|---|---|---|---|---|
| EA-10 | FIG. 4I | 0.26 | — | 1.33 | — | >70 |
| EA-11 | FIG. 4J | 0.23 | — | 1.33 | — | >70 |
| EA-2 | FIG. 4B | 0.930 | — | 1.33 | 207.8 | 18.3 |
| EA-9-2 | FIG. 4H | 0.620 | — | 3.77 | — | 18.4 |
| EA-10-2 | FIG. 4I | 0.690 | — | 3.55 | — | 18.4 |
| EA-11-2 | FIG. 4J | 0.790 | — | 4.68 | — | 18.2 |

In a second example, battery containment systems 10 including energy absorption components 30, 30' formed of steel (SPFC590) having an open hexagon repeating shape are tested to compare the effects of varying the wall angle α. In this example, the containment systems are subjected to 250 J impacts at an impact angles of 90 and 75 degrees. As shown in Table 2, in this example the thicknesses T1 and T2, pitch p, and mass are generally unchanged. The deformation results of the impact testing are reported in Table 2.

TABLE 2

| Analysis file | Shape/Reference FIG. | t1 mm | Mass kg | pitch mm | Deformation mm | wall angle | Impact angle |
|---|---|---|---|---|---|---|---|
| EA-2 | FIG. 7A (FIG. 4B) | 0.93 | 1.33 | 207.8 | 18.3 | 0 | 90 |
| EA-13 | FIG. 7B | 0.93 | 1.33 | 207.8 | 19.5 | 5 | 90 |
| EA-14 | FIG. 7C | 0.92 | 1.33 | 207.8 | 19.7 | 12.5 | 90 |
| EA-2-obli | FIG. 7A (FIG. 4B) | 0.93 | 1.33 | 207.8 | 19.8 | 0 | 75 |
| EA-13-obli | FIG. 7B | 0.93 | 1.33 | 207.8 | 19.4 | 5 | 75 |
| EA-14-obli | FIG. 7C | 0.92 | 1.33 | 207.8 | 19.9 | 12.5 | 75 |

In a third example, battery containment systems 10 including energy absorption components 30, 30' formed of steel (SPFC590), aluminum (A5052), and CFRTP (Teijin-SEREEBO®) having various geometries are tested for comparison. In this example, the containment systems are subjected to 250 J impacts at an impact angle of 90 degrees. Table 3 reports the details of the different geometries tested and resulting impact deformations for each material.

TABLE 3

| Analysis file | Shape/Reference FIG. | Material | t1 mm | t2 mm | Mass kg | pitch mm | Deformation mm |
|---|---|---|---|---|---|---|---|
| EA-1-2 | FIG. 4A | Steel (SPFC590) | 0.33 | 0.66 | 0.60 | 104.5 | 18.2 |
| EA-2 | FIG. 4B | Steel (SPFC590) | 0.93 | — | 1.33 | 207.8 | 18.3 |
| EA-11-2 | FIG. 4J | Steel (SPFC590) | 0.79 | — | 4.68 | — | 18.2 |
| EA-1-Al | FIG. 4A | Aluminum(A5052) | 0.82 | 1.64 | 0.52 | 104.5 | 18.6 |
| EA-2-Al | FIG. 4B | Aluminum (A5052) | 1.90 | — | 0.94 | 207.8 | 18.7 |
| EA-9-Al | FIG. 4H | Aluminum(A5052) | 0.95 | — | 2.00 | — | 18.8 |
| EA-1-Se | FIG. 4A | CFRTP(Teijin-SEREEBO®) | 1.40 | 2.80 | 0.45 | 104.5 | 17.9 |
| EA-2-Se | FIG. 4B | CFRTP(Teijin-SEREEBO®) | 3.00 | — | 0.75 | 207.8 | 18.7 |

In a fourth example, like the third example, battery containment systems 10 including energy absorption components 30, 30' formed of steel (SPFC590), aluminum (A5052), and CFRTP (Teijin-SEREEBO®) having various geometries are tested for comparison. In this example, the containment systems are subjected to 250 J impacts at an impact angle of 90 degrees. Table 4 reports the details of the different geometries tested and resulting impact deformations for each material.

TABLE 4

| Analysis file | Shape/Reference FIG. | Material | Ply | Percent of 0°ply | t1 mm | Mass kg | pitch mm | Deformation mm |
|---|---|---|---|---|---|---|---|---|
| EA-2 | FIG. 4B | Steel (SPFC590) | — | — | 0.93 | 1.33 | 207.8 | 18.3 |
| EA-11-2 | FIG. 4J | Steel (SPFC590) | — | — | 0.79 | 4.68 | — | 18.2 |
| EA-2-Al | FIG. 4B | aluminum (A5052) | — | — | 1.90 | 0.94 | 207.8 | 18.7 |
| EA-9-Al | FIG. 4H | aluminum (A5052) | — | — | 0.95 | 2.00 | — | 18.8 |
| EA-2-Se | FIG. 4B | CFRTP (Teijin-SEREEBO(R)) | — | — | 3.00 | 0.75 | 207.8 | 18.7 |
| EA-2-CFRP | FIG. 4B | CFRP(DSM, PA410) | [0/45/-45]s | 50 | 1.92 | 0.51 | 207.8 | 17.7 |
| EA-9-CFRP | FIG. 4H | CFRP(DSM, PA410) | [0/90]s | 25 | 0.80 | 0.90 | — | 17.6 |
| EA-2-GFRP | FIG. 4B | GFRP(DSM, PA410) | [0/45/-45]s | 50 | 2.72 | 0.85 | 207.8 | 17.9 |

TABLE 4-continued

| Analysis file | Shape/Reference FIG. | Material | Ply | Percent of 0°ply | t1 mm | Mass kg | pitch mm | Deformation mm |
|---|---|---|---|---|---|---|---|---|
| EA-9-GFRP | FIG. 4H | GFRP(DSM, PA410) | [0/90]s | 25 | 1.12 | 1.49 | — | 18.5 |

In a fifth example, battery containment systems 10 including energy absorption components 30, 30' formed of CFRP (DSM, PA410) having a repeating open hexagon shape and an extruded rectangular shape of various geometries are tested for comparison of ply. In this example, the containment systems are subjected to 250 J impacts at an impact angle of 90 degrees. The results of these tests are shown in Table 5.

TABLE 5

| Analysis file | Shape/Reference FIG. | Material | Ply | Percent of 0°ply | t1 mm | Mass kg | pitch mm | Deformation mm |
|---|---|---|---|---|---|---|---|---|
| EA-2-CFRP-1 | FIG. 4B | CFRP | 0 | 100 | 5.000 | 1.33 | 207.8 | 33.6 |
| EA-2-CFRP-2 | FIG. 4B | CFRP | [0/90]s | 50 | 5.000 | 1.33 | 207.8 | 5.7 |
| EA-2-CFRP-3 | FIG. 4B | CFRP | [0/45/-45]s | 50 | 5.000 | 1.33 | 207.8 | 5.1 |
| EA-2-CFRP-4 | FIG. 4B | CFRP | [0/45/-45]s | 75 | 5.000 | 1.33 | 207.8 | 5.6 |
| EA-2-CFRP-5 | FIG. 4B | CFRP | [0/45/-45]s | 25 | 5.000 | 1.33 | 207.8 | 5.2 |
| EA-2-CFRP-6 | FIG. 4B | CFRP | [45/-45]s | 0 | 5.000 | 1.33 | 207.8 | 6.4 |
| EA-9-CFRP-1 | FIG. 4H | CFRP | 0 | 100 | 1.180 | 1.33 | — | >70 |
| EA-9-CFRP-2 | FIG. 4H | CFRP | [0/90]s | 50 | 1.180 | 1.33 | — | 15.8 |
| EA-9-CFRP-3 | FIG. 4H | CFRP | [0/45/-45]s | 50 | 1.180 | 1.33 | — | 19.7 |
| EA-9-CFRP-4 | FIG. 4H | CFRP | [0/90]s | 75 | 1.180 | 1.33 | — | 22.6 |
| EA-9-CFRP-5 | FIG. 4H | CFRP | [0/90]s | 25 | 1.180 | 1.33 | — | 9.9 |
| EA-9-CFRP-6 | FIG. 4H | CFRP | 90 | 0 | 1.180 | 1.33 | — | >70 |

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A battery containment system comprising:
a unitary battery tray having a bottom and a plurality of walls including a first side wall, a second side wall, a first end wall, and a second end wall, the plurality of walls extending from the bottom of said tray and defining a cavity within said tray, the bottom of said tray having a first surface upon which a plurality of batteries are configured to rest and an oppositely disposed second surface, the bottom of said tray extending external to and beyond at least one of the first side wall, first end wall, the second side wall, and second end wall of said tray;
at least one energy absorption component attached to the bottom of said tray external to and along at least one of the first side wall, the first end wall, the second side wall, and the second end wall;
a reinforcing frame formed of reinforced polymer, aluminum, or steel and configured to reinforce said tray;
a cover having a cover body portion and a first flange extending from the cover body portion, the cover body portion configured to overlie the cavity within said tray and the plurality of walls of said tray, the first flange of said cover configured to extend beyond the plurality of walls of said tray; and
a shield having a shield body portion and a second flange extending from the shield body portion, the shield body portion configured to underlie, fully cover, and be in direct contact with the second surface of the bottom of said tray, the second flange of said shield configured to extend beyond the bottom of said tray and configured to directly engage the first flange of said cover.

2. The battery containment system of claim 1 wherein said at least one energy absorption component has a fire-resistant coating or phenolic coating.

3. The battery containment system of claim 1 wherein said tray, said cover, or both is formed of a reinforced sheet molding compound (SMC) or a reinforced phenolic-SMC.

4. The battery containment system of any of claim 1 wherein said tray, said cover, or both is coated in a coating that is at least one of first resistant, fire retardant, phenolic, or electromagnetic interference-radiofrequency interference (EMI-RFI) shielding.

5. The battery containment system of claim 4 wherein said coating is EMI-RFI shielding and applied as an electrically grounded sheet.

6. The battery containment system of claim 1 wherein said tray further comprises internal divider walls extending from the bottom of said tray between the first side wall and second side wall within the cavity.

7. The battery containment system of claim 1 wherein said tray, said cover, or both comprises: an open area core defining a plurality of pores, said open area core having a first face and a second face opposing the first face; a first surface sheet adhered to the first face of said open area core by a first adhesive layer; and a skin adhered to the second face of said open area core by a second adhesive layer.

8. The battery containment system of claim 7 wherein said skin is an impact resistant polymer, a fire retardant layer or an intumescent layer.

9. The battery containment system of claim 1 further comprising a temperature regulation system positioned within the cavity of said tray.

10. The battery containment system of claim 1 wherein said cover is formed of reinforced sheet molding compound (SMC).

11. The battery containment system of claim 1 wherein said shield is formed of metal or reinforced SMC.

12. The battery containment system of claim 1 wherein said cover and said shield are coated in a fire resistant or phenol coating.

13. The battery containment system of claim 1 wherein said cover and said shield provide EMI-RFI shielding to components contained therein.

14. The battery containment system of claim 1 further comprising a barrier material configured to be positioned between the first flange and the second flange.

15. The battery containment system of claim 14 wherein at least one of the first flange and the second flange define a channel therein configured to receive the barrier material.

16. The battery containment system of claim 1 wherein the at least one energy absorption component has a rectilinear cross-section and is formed of steel.

17. The battery containment system of claim 1 wherein the at least one energy absorption component further comprises at least one internal compartment formed therein and filled with an energy absorbing foam.

18. A battery containment system comprising:
- a unitary battery tray having a bottom and a plurality of walls including a first side wall, a second side wall, a first end wall, and a second end wall, the plurality of walls extending from the bottom of said tray and defining a cavity within said tray, the bottom of said tray having a first surface upon which a plurality of batteries are configured to rest and an oppositely disposed second surface, the bottom of said tray extending external to and beyond at least one of the first side wall, first end wall, the second side wall, and second end wall of said tray;
- at least one energy absorption component attached to the bottom of said tray external to and along at least one of the first side wall, the first end wall, the second side wall, and the second end wall;
- a reinforcing frame formed of reinforced polymer, aluminum, or steel and configured to reinforce said tray;
- a cover having a cover body portion and a first flange extending from the cover body portion, the cover body portion configured to overlie the cavity within said tray and the plurality of walls of said tray, the first flange of said cover configured to extend beyond the plurality of walls of said tray;
- a shield having a shield body portion and a second flange extending from the shield body portion, the shield body portion configured to underlie, fully cover, and be in direct contact with the second surface of the bottom of said tray, the second flange of said shield configured to extend beyond the bottom of said tray and configured to directly engage the first flange of said cover; and
- a joiner clip configured with a C-shaped cross section to engage the first flange and the second flange to join said cover to said shield.

19. The battery containment system of claim 18 wherein the joiner clip comprises a base section and a pair of jaws extending from the base section each jaw of the pair of jaws having a free end.

* * * * *